United States Patent
Brunner et al.

(10) Patent No.: US 10,325,184 B2
(45) Date of Patent: Jun. 18, 2019

(54) DEPTH-VALUE CLASSIFICATION USING FORESTS

(71) Applicant: YouSpace, Inc., Mountain View, CA (US)

(72) Inventors: Ralph Brunner, Los Gatos, CA (US); Yichen Pan, Mountain View, CA (US)

(73) Assignee: YouSpace, Inc., Santa Clara, CA (US)

( * ) Notice: Subject to any disclaimer, the term of this patent is extended or adjusted under 35 U.S.C. 154(b) by 87 days.

(21) Appl. No.: 15/486,218

(22) Filed: Apr. 12, 2017

(65) Prior Publication Data
US 2018/0300591 A1 Oct. 18, 2018

(51) Int. Cl.
G06K 9/62 (2006.01)
G06F 3/01 (2006.01)
G06K 9/00 (2006.01)

(52) U.S. Cl.
CPC .......... *G06K 9/6282* (2013.01); *G06F 3/017* (2013.01); *G06K 9/00355* (2013.01); *G06K 9/6255* (2013.01); *G06K 9/6256* (2013.01); *G06K 9/6262* (2013.01); *G06K 9/6269* (2013.01); *G06K 2209/40* (2013.01)

(58) Field of Classification Search
CPC .............................. G06F 3/017; G06K 9/6282
See application file for complete search history.

(56) References Cited

U.S. PATENT DOCUMENTS 4,870,228 A * 9/1989 Speer ................... B60Q 1/1469
200/4
5,534,917 A 7/1996 MacDougall
7,058,204 B2 6/2006 Hildreth et al.
7,227,526 B2 6/2007 Hildreth et al.
(Continued)

FOREIGN PATENT DOCUMENTS

WO WO2015195652 12/2015
WO WO2014100250 6/2017

OTHER PUBLICATIONS

Gestigon GMBH, Oyster Advanced Body Skeleton Tracking—YouTube, Published Jun. 6, 2016. Available at https://www.youtube.com/watch?v=UiEq64H07Gk&feature=youtu.be. (Retrieved Sep. 6, 2017).

(Continued)

*Primary Examiner* — Iman K Kholdebarin
*Assistant Examiner* — Mai H Tran

(57) ABSTRACT

Human Computer Interfaces (HCI) may allow a user to interact with a computer via a variety of mechanisms, such as hand, head, and body gestures. Various of the disclosed embodiments allow information captured from a depth camera on an HCI system to be used to recognize such gestures. Particularly, by training a classifier using vectors having both base and extended components, more accurate classification results may be subsequently obtained. The base vector may include a leaf-based assessment of the classification results from a forest for a given depth value candidate pixel. The extended vector may include additional information, such as the leaf-based assessment of the classification results for one or more pixels related to the candidate pixel. Various embodiments employ this improved structure with various optimization methods and structure to provide more efficient in-situ operation.

21 Claims, 26 Drawing Sheets

(56) References Cited

U.S. PATENT DOCUMENTS

| | | | |
|---|---|---|---|
| 8,208,719 B2 | 6/2012 | Gordon et al. | |
| 8,566,030 B1* | 10/2013 | Demiryurek | G01C 21/3492 |
| | | | 701/409 |
| 9,292,767 B2* | 3/2016 | Oberg | G06K 9/00986 |
| 9,323,338 B2 | 4/2016 | He et al. | |
| 9,383,895 B1* | 7/2016 | Vinayak | G06F 3/017 |
| 9,424,490 B2* | 8/2016 | Muff | G06K 9/6267 |
| 9,448,636 B2* | 9/2016 | Balzacki | G06F 3/017 |
| 2003/0095134 A1* | 5/2003 | Tuomi | G06T 11/40 |
| | | | 345/611 |
| 2012/0183203 A1* | 7/2012 | Han | G06K 9/00201 |
| | | | 382/154 |
| 2012/0314031 A1* | 12/2012 | Shotton | G06K 9/00375 |
| | | | 348/46 |
| 2013/0251192 A1* | 9/2013 | Tu | G06K 9/00375 |
| | | | 382/103 |
| 2013/0278501 A1* | 10/2013 | Bulzacki | G06F 3/017 |
| | | | 345/157 |
| 2013/0336524 A1* | 12/2013 | Zhang | G06K 9/00355 |
| | | | 382/103 |
| 2014/0043232 A1* | 2/2014 | Kurokawa | G06F 3/005 |
| | | | 345/156 |
| 2014/0043435 A1* | 2/2014 | Blayvas | H04N 5/232 |
| | | | 348/46 |
| 2014/0225977 A1 | 8/2014 | Vilcovsky et al. | |
| 2014/0226000 A1 | 8/2014 | Vilcovsky et al. | |
| 2014/0226900 A1 | 8/2014 | Saban et al. | |
| 2015/0109202 A1* | 4/2015 | Ataee | G06F 3/017 |
| | | | 345/156 |
| 2015/0278849 A1* | 10/2015 | Reichert | G06Q 30/0242 |
| | | | 705/14.41 |
| 2016/0127710 A1 | 5/2016 | Saban et al. | |
| 2016/0328604 A1* | 11/2016 | Bulzacki | G06K 9/00335 |
| 2017/0161592 A1 | 6/2017 | Su et al. | |
| 2017/0161607 A1 | 6/2017 | English et al. | |
| 2018/0150713 A1* | 5/2018 | Farooqi | G06K 9/4604 |
| 2018/0300591 A1* | 10/2018 | Brunner | G06K 9/6282 |

OTHER PUBLICATIONS

Stone, A et al, Teaching Compositionality to CNNs, (Submitted on Jun. 14, 2017), acquired Sep. 8, 2017 from https://arxiv.org/abs/1706.04313.

Kansky, K et al, Schema Networks: Zero-shot Transfer with a Generative Causal Model of Intuitive Physics, (Submitted on Jun. 14, 2017), acquired Sep. 8, 2017 from https://arxiv.org/abs/1706.04317.

Vicarious, Vicarious | Blog—website. Available at https://www.vicarious.com/general-game-playing-with-schema-networks.html. (Retrieved Sep. 6, 2017).

Vicarious, Vicarious | Home | AI for the robot age—website. Available at https://www.vicarious.com/. (Retrieved Sep. 6, 2017).

Jamie Shotton, et al., Real-Time Human Pose Recognition in Parts from Single Depth Images, Proceedings of CVPR, Jun. 2011, IEEE, United States.

Jamie Shotton, et al., Efficient Human Pose Estimation from Single Depth Images, Trans. PAMI, 2012, IEEE, United States.

LIBSVM Tools, https://www.csie.ntu.edu.tw/~cjlin/libsvmtools/. (Retrieved Feb. 6, 2017).

LIBLINEAR—A Library for Large Linear Classification. https://www.csie.ntu.edu.tw/~cjlin/liblinear/. (Retrieved Feb. 6, 2017).

Ren, Shaoqing, et al. "Global refinement of random forest." available at http://www.cv-foundation.org/openaccess/content_cvpr_2015/papers/Ren_Global_Refinement_of_2015_CVPR_paper.pdf. (Retrieved on Feb. 8, 2017).

Leo Breiman, Random Forests. 2001. Available at https://www.stat.berkeley.edu/~breiman/randomforest2001.pdf. (Retrieved Feb. 8, 2017).

Chih-Chung Chang, et al., LIBSVM: A Library for Support Vector Machines. Available at http://www.csie.ntu.edu.tw/~cjlin/papers/libsvm.pdf. (Retrieved Feb. 8, 2017).

Dong Chen, et al., Blessing of Dimensionality: High-dimensional Feature and Its Efficient Compression for Face Verification. Available at http://jiansun.org/papers/CVPR13_HighDim.pdf. (Retrieved Feb. 8, 2017).

Simon Bernard, et al., Dynamic Random Forests. Available at https://hal.archives-ouvertes.fr/hal-00710083/document. (Retrieved Feb. 8, 2017).

Simon Bernard, et al., Forest-RK: A New Random Forest Induction Method. Available at https://hal.archives-ouvertes.fr/hal-00436367/document. (Retrieved Feb. 8, 2017).

Juergen Gall, et al., Class-Specific Hough Forests for Object Detection. http://projectsweb.cs.washington.edu/research/insects/CVPR2009/objdetrec/hughforest_objdetect.pdf. (Retrieved Feb. 8, 2017).

Manish Mehta, et al., MDL-based Decision Tree Pruning. Available at https://www.aaai.org/Papers/KDD/1995/KDD95-025.pdf. (Retrieved Feb. 8, 2017).

Rong-En Fan, et al., LIBLINEAR: A Library for Large Linear Classification. http://www.csie.ntu.edu.tw/~cjlin/papers/liblinear.pdf. (Retrieved Feb. 8, 2017).

Y. Amit and D. Geman, Shape quantization and recognition with randomized trees. http://www.wisdom.weizmann.ac.il/~vision/courses/2003_2/shape.pdf. (Retrieved Feb. 23, 2017).

J. R. Quinlan, Induction of decision trees. http://hunch.net/~coms-4771/quinlan.pdf. (Retrieved Feb. 23, 2017).

B. A. Shepherd, An appraisal of a decision tree approach to image classification. https://pdfs.semanticscholar.org/98e4/5102842acb101d66dc53dc898877d34a54b8.pdf. (Retrieved Feb. 23, 2017).

Ren, Shaoqing, et al. "Global refinement of random forest." 2015. Available at http://www.cv-foundation.org/openaccess/content_cvpr_2015/papers/Ren_Global_Refinement_of_2015_CVPR_paper.pdf. (Retrieved on Feb. 8, 2017).

Chih-Chung Chang, et al., LIBSVM: A Library for Support Vector Machines. 2011. Available at http://www.csie.ntu.edu.tw/~cjlin/papers.libsvm.pdf. (Retrieved Feb. 8, 2017).

Dong Chen, et al., Blessing of Dimensionality: High-dimensional Feature and Its Efficient Compression for Face Verification. 2013. Available at http://jiansun.org/papers/CVPR13_HighDim.pdf. (Retrieved Feb. 8, 2017).

Simon Bernard, et al., Dynamic Random Forests. 2012. Available at https://hal.archives-ouvertes.fr/hal-00710083/document. (Retrieved Feb. 8, 2017).

Simon Bernard, et al., Forest-RK: A New Random Forest Induction Method. 2009. Available at https://hal.archives-ouvertes.fr/hal-00436367/document. (Retrieved Feb. 8, 2017).

Juergen Gall, et al., Class-Specific Hough Forests for Object Detection. 2009. Available at http://projectsweb.cs.washington.edu/research/insects/CVPR2009/objdetrec/hughforest_objdetect.pdf. (Retrieved Feb. 8, 2017).

Manish Mehta, et al., MDL-based Decision Tree Pruning. 1995. Available at https://www.aaai.org/Papers/KDD/1995/KDD95-025.pdf. (Retrieved Feb. 8, 2017).

Rong-En Fan, et al., LIBLINEAR: A Library for Large Linear Classification. 2008. Available at http://www.csie.ntu.edu.tw/~cjlin/papers/liblinear.pdf. (Retrieved Feb. 8, 2017).

Y. Amit and D. Geman, Shape quantization and recognition with randomized trees. 1996. Available at http://www.wisdom.weizmann.ac.il/~vision/courses/2003_2/shape.pdf. (Retrieved Feb. 23, 2017).

J. R. Quinlan, Induction of decision trees. 1986. Available at http://hunch.net/~coms-4771/quinlan.pdf. (Retrieved Feb. 23, 2017).

B. A. Shepherd, An appraisal of a decision tree approach to image classification. 1983. Available at https://pdfs.semanticscholar.org/98e4/5102842acb101d66dc53dc898877d34a54b8.pdf. (Retrieved Feb. 23, 2017).

K. K. Biswas et al., "Gesture Recognition Using Microsoft Kinect®". 2011. Available at http://ai2-s2-pdfs.s3.amazonaws.com/92b4/c8655484b603e33aea87e9Oba598989ce069.pdf (Retrieved Jul. 5, 2017).

International Search Report & Written Opinion, PCT/US2017/027449; dated Jun. 27, 2017; 24 Pages.

* cited by examiner

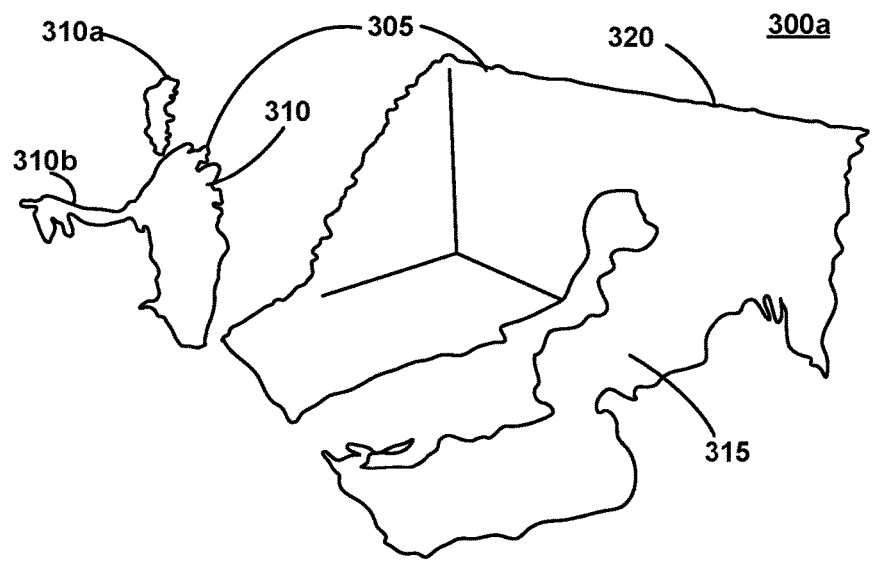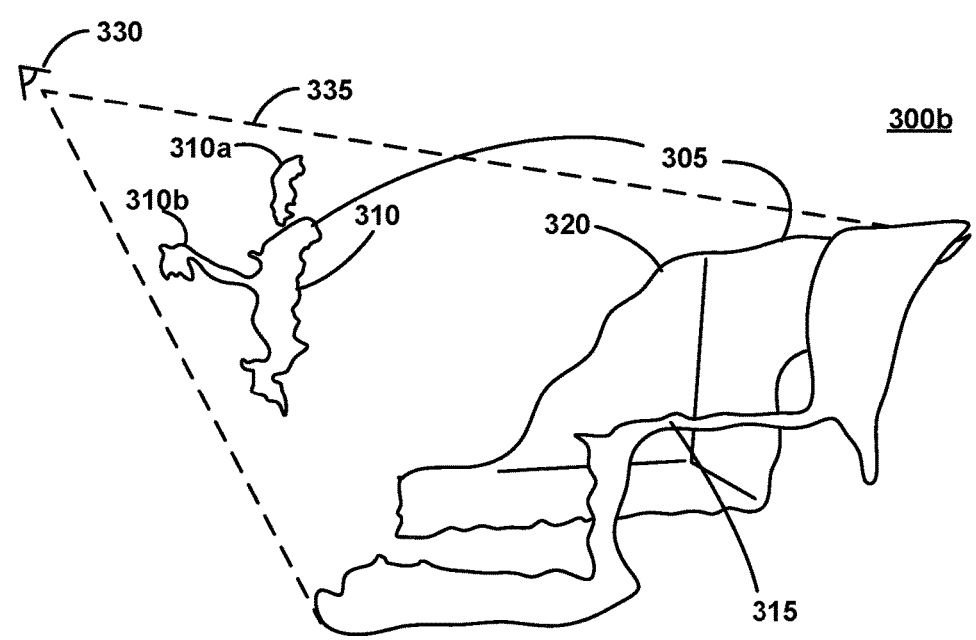
FIG. 3

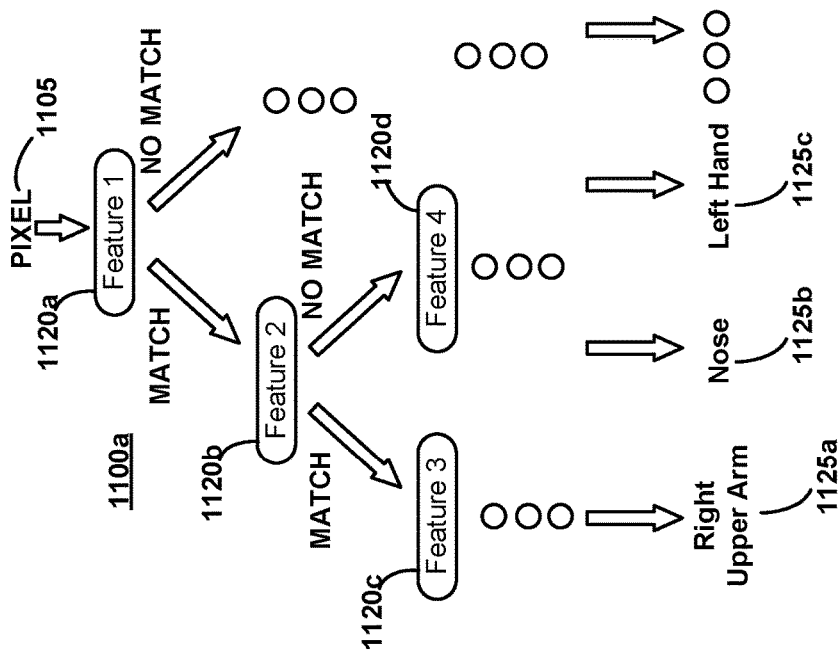
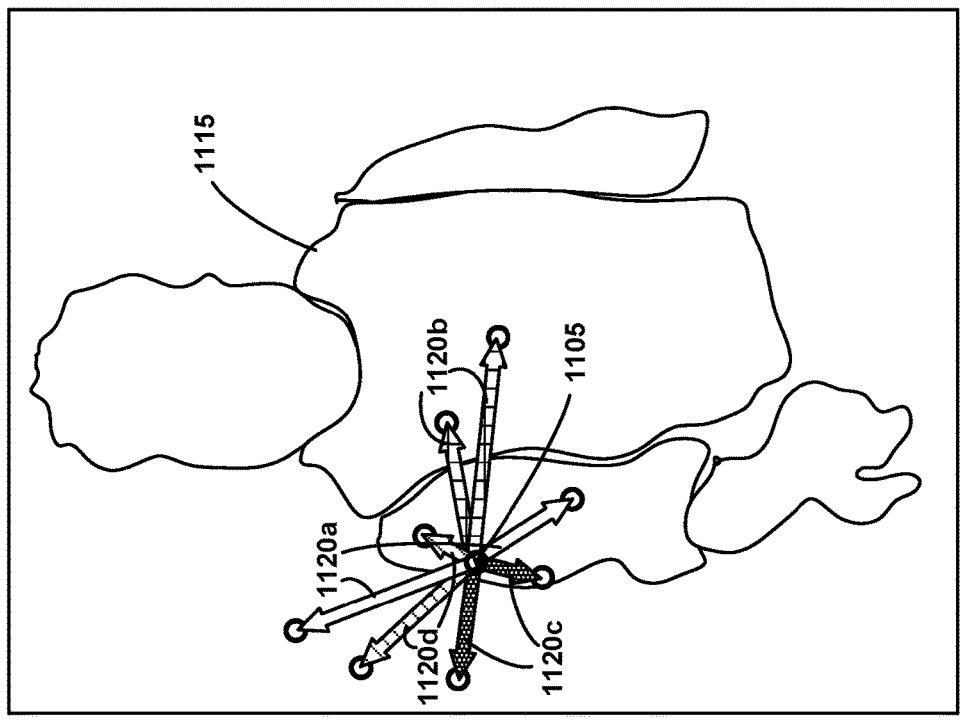
FIG. 11

```
1    Function generate_trained_classifier(Array training_images)
2    {
3       subsets = break_training_images_into_subsets(training_images);
4
5       For each subset in subsets
6       {   forest.append_tree(generate_tree_from_subset(subset));   }
7
8       i = 0;
9       For each image in training_images
10      {
11         For each pixel in image
12         {
13            vectors[i].base = leaves_to_array(pixel, forest);
14            vectors[i].class = image.class_for_pixel(pixel);
15            i++;
16         }
17      }
18
19      i = 0;
20      For each image in training_images
21      {
22         For each pixel in image
23         {
24            related_pixels = determine_related_pixels(pixel);
25            For each related_pixel in related_pixels
26            {
27               related_pixel_data = get_data_for(related_pixel);
28               vectors[i].extension.add_data(related_pixel_data);
29            }
30            i++;
31         }
32      }
33      trained_classifier = perform_machine_learning(vectors);
34      return trained_classifier;
35   }
```

*FIG. 20*

DEPTH-VALUE CLASSIFICATION USING FORESTS

BACKGROUND

Human-computer interaction (HCI) systems are becoming increasingly prevalent in our society. With this increasing prevalence has come an evolution in the nature of such interactions. Punch cards have been surpassed by keyboards, which were themselves complemented by mice, which are themselves now complemented by touch screen displays, etc. Various machine vision approaches may even now facilitate visual, rather than the mechanical, user feedback. Machine vision allows computers to interpret images from their environment to, e.g., recognize users' faces and gestures. Some machine vision systems rely upon grayscale or RGB images of their surroundings to infer user behavior. Some machine vision systems may also use depth-based sensors, or rely exclusively upon depth based sensors, to recognize user behavior (e.g., the Microsoft Kinect™, Intel RealSense™, Apple PrimeSense™, Structure Sensor™, Velodyne HDL-32E LiDAR™, Orbbec Astra™, etc.).

Many depth-based systems rely upon classification algorithms to distinguish different objects in their environment. For example, the system may wish to recognize a user's right hand distinctly from the user's face. The hand may further be broken down to recognize an extended index finger, while the face may be broken down to recognize a nose, so as to infer a direction the user is pointing and a direction of the user's gaze, respectively. Such classifications may be desired under widely varying circumstances. For example, the depth sensor may be placed at a variety of different orientations during use and may be confronted with users of disparate proportions and anatomy. Accordingly, there exists a need to more quickly and more accurately classify objects appearing in an environment using depth data.

BRIEF DESCRIPTION OF THE DRAWINGS

Various of the embodiments introduced herein may be better understood by referring to the following Detailed Description in conjunction with the accompanying drawings, in which like reference numerals indicate identical or functionally similar elements:

FIG. 3 is a series of perspective and side views of example depth data as may be used in some embodiments;

FIG. 11 illustrates an example application of features to generate a classification tree as may occur in some embodiments;

FIG. 20 is a pseudo-code listing illustrating an example implementation of a two-pass training vector generation method, as may be implemented in some embodiments;

Figure 1:
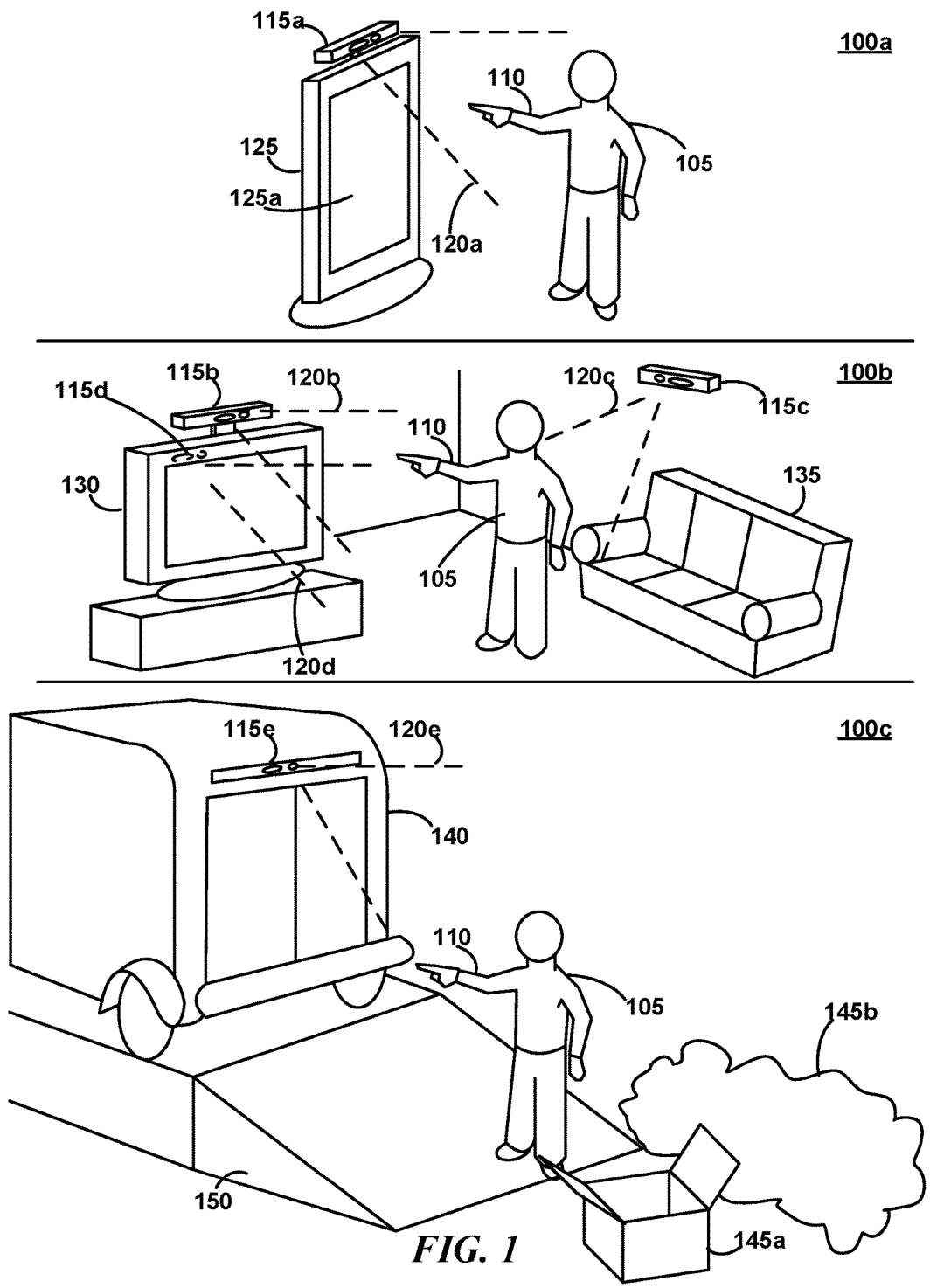
FIG. 1 is a series of use case diagrams illustrating various situations in which various of the disclosed embodiments may be implemented.

The specific examples depicted in the drawings have been selected to facilitate understanding. Consequently, the disclosed embodiments should not be restricted to the specific details in the drawings or the corresponding disclosure. For example, the drawings may not be drawn to scale, the dimensions of some elements in the figures may have been adjusted to facilitate understanding, and the operations of the embodiments associated with the flow diagrams may encompass additional, alternative, or fewer operations than those depicted here. Thus, some components and/or operations may be separated into different blocks or combined into a single block in a manner other than as depicted. The intention is not to limit the embodiments to the particular examples described or depicted. On the contrary, the embodiments are intended to cover all modifications, equivalents, and alternatives falling within the scope of the disclosed examples.

DETAILED DESCRIPTION

Example Use Case Overview

Various of the disclosed embodiments may be used in conjunction with a mounted or fixed depth camera system to detect, e.g. user gestures. FIG. 1 is a series of use case diagrams illustrating various situations 100*a-c* in which various of the disclosed embodiments may be implemented. In situation 100*a*, a user 105 is standing before a kiosk 125 which may include a graphical display 125*a*. Rather than requiring the user to physically touch items of interest on the display 125*a* the system may allow the user to "point" or "gesture" at the items and to thereby interact with the kiosk 125.

A depth sensor 115*a* may be mounted upon or connected to or near the kiosk 125 so that the depth sensor's 115*a* field of depth capture 120*a* (also referred to as a "field of view" herein) encompasses gestures 110 made by the user 105. Thus, when the user points at, e.g., an icon on the display 125*a* by making a gesture within the field of depth data capture 120*a* the depth sensor 115*a* may provide the depth values to a processing system, which may infer the selected icon or operation to be performed. The processing system may be configured to perform various of the operations disclosed herein and may be specifically configured, or designed, for interfacing with a depth sensor (indeed, it may be embedded in the depth sensor). Accordingly, the processing system may include hardware, firmware, software, or a combination of these components. The processing system may be located within the depth sensor 115*a*, within the kiosk 125, at a remote location, etc. or distributed across locations. The applications running on the kiosk 125 may simply receive an indication of the selected icon and may not be specifically designed to consider whether the selection was made via physical touch vs. depth based determinations of the selection. Thus, the depth sensor 115*a* and the processing system may be an independent product or device from the kiosk 125 in some embodiments.

In situation 100*b*, a user 105 is standing in a domestic environment which may include one or more depth sensors 115*b*, 115*c*, and 115*d* each with their own corresponding fields of depth capture 120*b*, 120*c*, and 120*d* respectively.

Depth sensor 115*b* may be located on or near a television or other display 130. The depth sensor 115*b* may be used to capture gesture input from the user 105 and forward the depth data to an application running on or in conjunction with the display 130. For example, a gaming system, computer conferencing system, etc. may be run using display 130 and may be responsive to the user's 105 gesture inputs. In contrast, the depth sensor 115*c* may passively observe the user 105 as part of a separate gesture or behavior detection application. For example, a home automation system may respond to gestures made by the user 105 alone or in conjunction with various voice commands. In some embodiments, the depth sensors 115*b* and 115*c* may share their depth data with a single application to facilitate observation of the user 105 from multiple perspectives. Obstacles and non-user dynamic and static objects, e.g. couch 135, may be present in the environment and may or may not be included in the fields of depth capture 120*b*, 120*c*.

Note that while the depth sensor may be placed at a location visible to the user 105 (e.g., attached on top or mounted upon the side of televisions, kiosks, etc. as depicted, e.g., with sensors 115*a-c*) some depth sensors may be integrated within another object. Such an integrated sensor may be able to collect depth data without being readily visible to user 105. For example, depth sensor 115*d* may be integrated into television 130 behind a one-way mirror and used in lieu of sensor 115*b* to collect data. The one-way mirror may allow depth sensor 115*d* to collect data without the user 105 realizing that the data is being collected. This may allow the user to be less self-conscious in their movements and to behave more naturally during the interaction.

While the depth sensors 115*a-d* may be positioned parallel to a wall, or with depth fields at a direction orthogonal to a normal vector from the floor, this may not always be the case. Indeed, the depth sensors 115*a-d* may be positioned at a wide variety of angles, some of which place the fields of depth data capture 120*a-d* at angles oblique to the floor and/or wall. For example, depth sensor 115*c* may be positioned near the ceiling and be directed to look down at the user 105 on the floor.

This relation between the depth sensor and the floor may be extreme and dynamic in some situations. For example, in situation 100*c* a depth sensor 115*e* is located upon the back of a van 140. The van may be parked before an inclined platform 150 to facilitate loading and unloading. The depth sensor 115*e* may be used to infer user gestures to direct the operation of the van (e.g., move forward, backward) or to perform other operations (e.g., initiate a phone call). Because the van 140 regularly enters new environments, new obstacles and objects 145*a,b* may regularly enter the depth sensor's 115*e* field of depth capture 120*e*. Additionally, the inclined platform 150 and irregularly elevated terrain may often place the depth sensor 115*e*, and corresponding field of depth capture 120*e*, at oblique angles relative to the "floor" on which the user 105 stands. Such variation can complicate assumptions made regarding the depth data in a static and/or controlled environment (e.g., assumptions made regarding the location of the floor).

Figure 2:
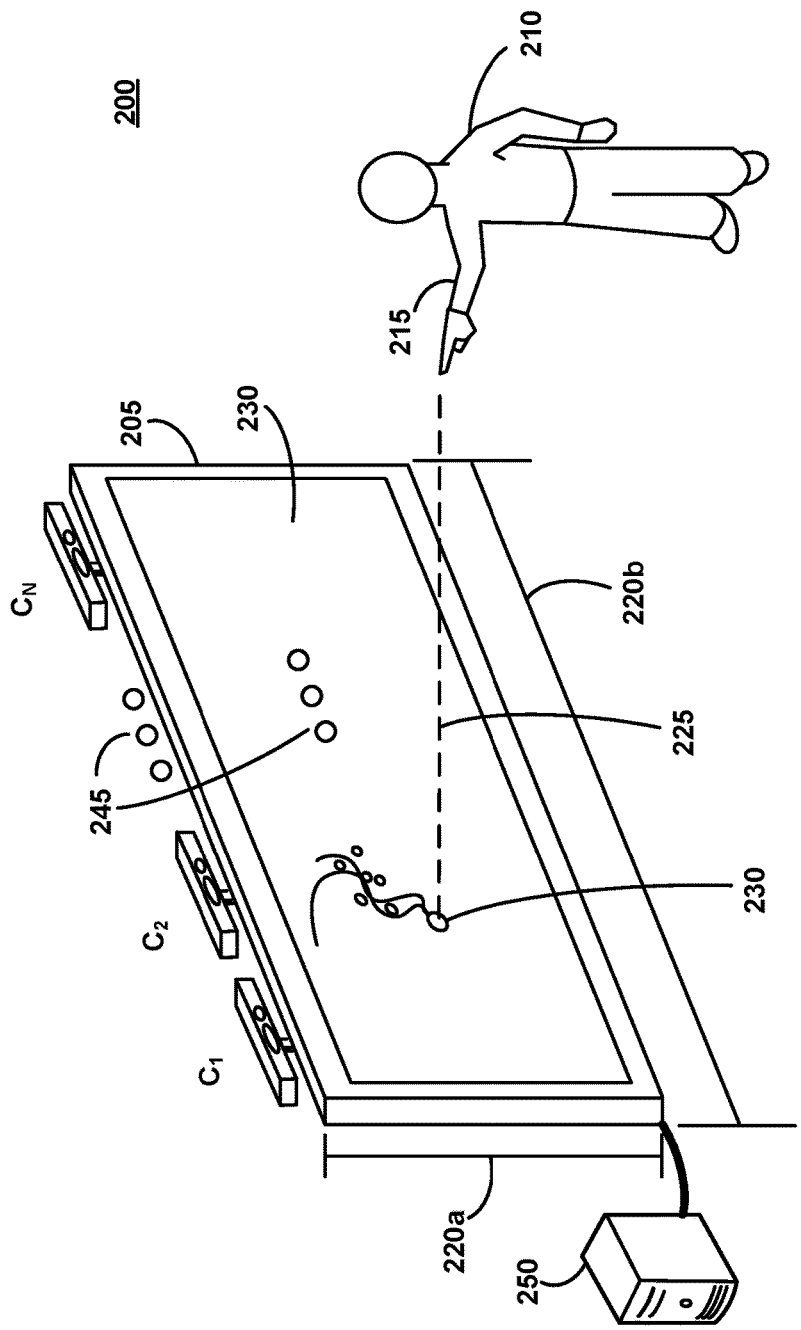
FIG. 2 is a perspective use case diagram illustrating an example user interaction with an example display structure as may occur in some embodiments.

Various of the disclosed embodiments contemplate user interactions with a feedback system comprising two or more depth sensors. The depth sensor devices may also include visual image sensors, e.g., RGB sensors, in some embodiments. For example, FIG. 2 is a perspective use case diagram illustrating an example user interaction 200 with an example display structure 205 as may occur in some embodiments. The display structure 205 may be placed in a mall, shopping center, grocery, check-in line, etc. In some embodiments, the height 220*a* is at least as large as a user 210 or slightly larger, e.g., 7-10 feet. The length 220*b* may be several times the user's 210 width, e.g., to facilitate an interaction as the user 210 walks the length of the display structure 205.

The example display structure 205 includes a screen 230. The screen 230 may comprise a single large screen, multiple smaller screens placed adjacent to one another, a projection, etc. In one example interaction, the user may gesture 215 at a portion of the screen and the system may present a visual feedback, such as a cursor 230 at a location corresponding to the gesture's projection 225 upon the screen. The display structure 205 may monitor the user's 210 movement and gestures using a plurality of one or more depth sensors $C_1$, $C_2, \ldots, C_N$. In the example depicted in FIG. 2, at least three cameras are present. The ellipses 245 indicate that more than three cameras may be present in some embodiments, and the length 220*b* of the display structure 205 may be adjusted accordingly. In this example, the sensors are evenly spaced across the top of the display structure 205, though in some embodiments they may be unevenly spaced.

Though the terms "camera" and "sensor" may be used interchangeably in this application, one will recognize that the depth sensor need not be or facilitate the "camera capture" of optical images, e.g., RGB or grayscale images, though the depth sensor may additionally include that functionality. In some embodiments, the computer system 250 may be specifically designed to facilitate calibration, e.g., in the form of a preprogrammed chip, circuit, Field Programmable Gate Array (FPGA), etc. One will recognize that "computer system", "processing system", and the like may be used interchangeably herein. Similarly, one will readily appreciate that the training system need not be the same system as the testing system (though they may be). Accordingly, in some embodiments, the "system" may be a computer distinct from the interfaces of FIGS. 1 and 2, residing, e.g., off-site from where the in-situ classification occurs.

Example Depth Data

Analogous to common optical image cameras, depth sensors 115*a-e*, $C_1, C_2, \ldots, C_N$ may capture individual "frames" of depth data over time. Each "frame" may comprise a collection of three-dimensional values for depths measured in the field of view (though one will readily recognize multiple ways to represent, e.g., a time of flight analysis for depth determination). These three dimensional values may be represented, e.g., as points in three-dimensional space, as distances for rays emitted at various angles from the depth sensor, etc. FIG. 3 is a series of perspective 300*a* and side 300*b* views of example depth data 305 as may be used in some embodiments. In this example, a user is pointing at the depth sensor with his right hand while standing in front of a wall. A table to his left has also been captured in the field of view. Thus, depth values associated with the user 310 include a portion associated with the user's head 310*a* and a portion associated with the user's extended right arm 310*b*. Similarly, the background behind the user is reflected in the depth values 320, including those values 315 associated with the table.

To facilitate understanding, the side view 300*b* also includes a depiction of the depth sensor's field of view 335 at the time of the frame capture. The depth sensor's angle 330 at the origin is such that the user's upper torso, but not the user's legs have been captured in the frame. Again, this example is merely provided to accommodate the reader's understanding, and the reader will appreciate that some embodiments may capture the entire field of view without omitting any portion of the user. For example, the embodiments depicted in FIGS. 1A-C may capture less than all of the interacting user, while the embodiments of FIG. 2 may capture the entirety of the interacting (in some embodiments, everything that is more than 8 cm off the floor appears in the depth field of view). Of course, the reverse may be true depending upon the orientation of the system, depth camera, terrain, etc. Thus, one will appreciate that variations upon the disclosed examples are explicitly contemplated (e.g., classes referencing torso components are discussed below, but some embodiments will also consider classifications of legs, feet, clothing, user pairings, user poses, etc.).

Similarly, though FIG. 3 depicts the depth data as a "point cloud", one will readily recognize that the data received from a depth sensor may appear in many different forms. For example, a depth sensor, such as depth sensor 115*a* or 115*d*, may include a grid-like array of detectors. These detectors may acquire an image of the scene from the perspective of fields of depth captures 120*a* and 120*d* respectively. For example, some depth detectors include an "emitter" producing electromagnetic radiation. The travel time from the emitter to an object in the scene, to one of the grid cell detectors may correspond to the depth value associated with that grid cell. The depth determinations at each of these detectors may be output as a two-dimensional grid of depth values. A "depth frame" as used herein may refer to such a two-dimensional grid, but can also refer to other representations of the three-dimensional depth data acquired from the depth sensor (e.g., a point cloud, a sonographic image, etc.).

Example Depth Data Clipping Methodology

Figure 4:
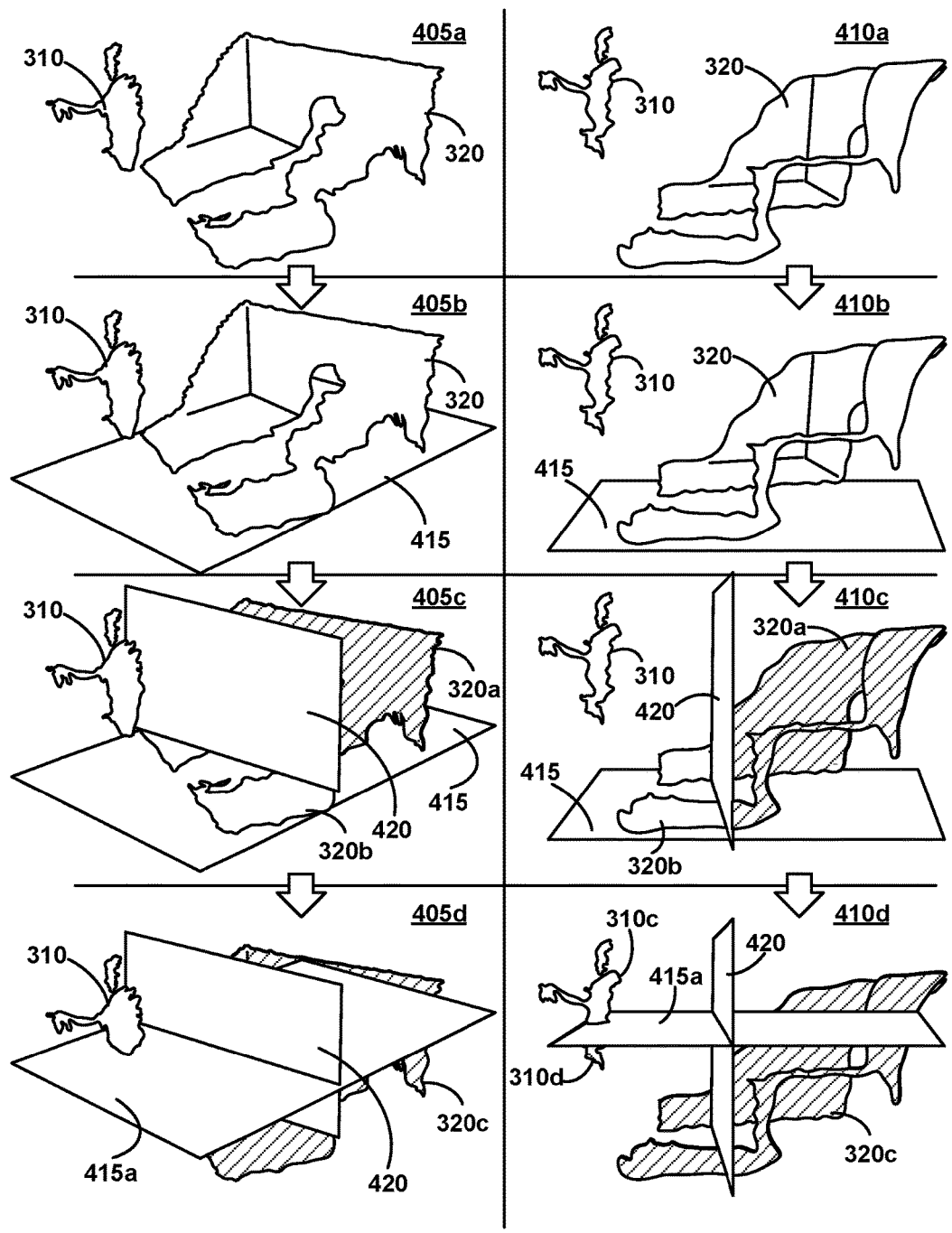
FIG. 4 is a series of views illustrating data isolation via plane clipping as may be applied to the depth data of FIG. 3 in some embodiments.

Many applications would like to infer the user's gestures from the depth data 305. Accomplishing this from the raw depth data could be quite challenging and so some embodiments apply preprocessing procedures to isolate the depth values of interest. For example, FIG. 4 is a series of views illustrating data isolation via plane clipping as may be applied to the depth data 305 of FIG. 3 in some embodiments. Particularly, perspective view 405*a* and side view 410*a* illustrate the depth data 305 (including portions associated with the user 310 and portions associated with the background 320). Perspective view 405*b* and side view 410*b* show the depth data 305 relative to a floor plane 415. The floor plane 415 is not part of the depth frame data 305. Rather, the floor plane 415 may be assumed based upon context or estimated by the processing system.

Perspective view 405*c* and side view 410*c* introduce a wall plane 420, which may also be assumed or estimated by the processing system. The floor and wall plane may be used as "clipping planes" to exclude depth data from subsequent processing. For example, based upon the assumed context in which the depth sensor is used, a processing system may place the wall plane 420 halfway to the maximum range of the depth sensor's field of view. Depth data values behind this plane may be excluded from subsequent processing. For example, the portion 320*a* of the background depth data may be excluded, but the portion 320*b* may be retained as shown in perspective view 405*c* and side view 410*c*.

Ideally, the portion 320*b* of the background would also be excluded from subsequent processing, since it does not encompass data related to the user. Some embodiments further exclude depth data by "raising" the floor plane 415 based upon context to a position 415*a* as shown in perspective view 405*d* and side view 410*d*. This may result in the exclusion of the portion 320*b* from future processing. These clipping operations may also remove portions of the user data 310*d* which will not contain gestures (e.g., the lower torso). As mentioned previously, the reader will appreciate that this example is provided merely to facilitate understanding and that in some embodiments (e.g., those of systems as appear in FIG. 2) clipping may be omitted entirely, or may occur only very close to the floor, so that leg and even foot data are both still captured. Thus, only the portion 310*c* remains for further processing. One will recognize that FIG. 4 simply depicts one possible clipping process for a given context. Different contexts, for example, situations where gestures include the user's lower torso, may be addressed in a similar fashion. Many such operations may still require an accurate assessment of the floor 415 and wall 420 planes to perform accurate clipping.

Example Depth Data Classification Methodology

Figure 5:
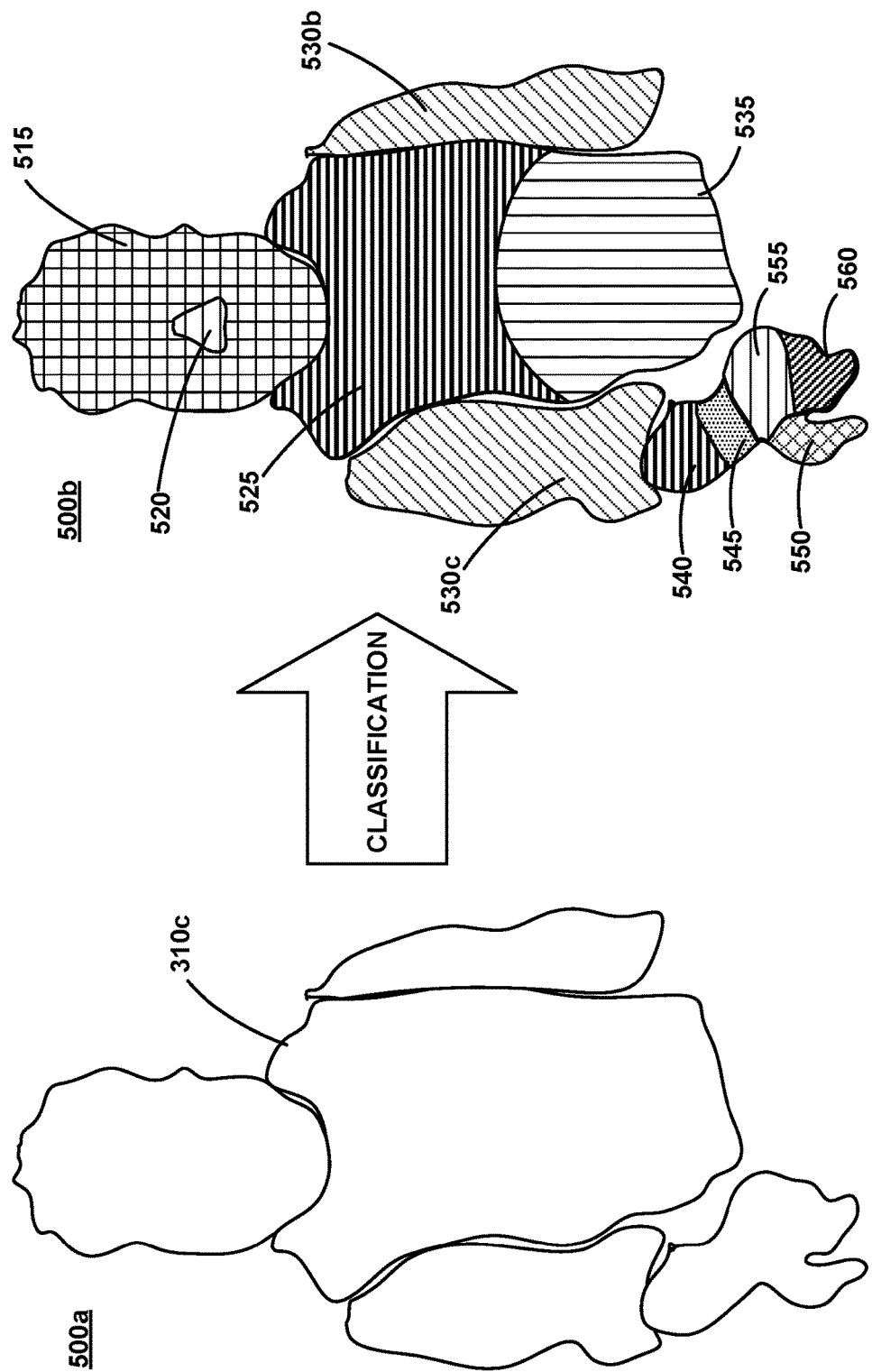
FIG. 5 is an example component classification as may be applied to the isolated data of FIG. 4 in some embodiments.

Following the isolation of the depth values (which may not occur in some embodiments), which may contain gesture data of interest, the processing system may classify the depth values into various user portions. These portions, or "classes", may reflect particular parts of the user's body and can be used to infer gestures. FIG. 5 is an example component classification as may be applied to the isolated data of FIG. 4 in some embodiments. Initially 500*a*, the extracted data 310*c* may be unclassified. Following classification 500*b*, each of the depth values may be associated with a given classification. The granularity of the classification may reflect the character of the gestures of interest. For example, some applications may be interested in the direction the user is looking, and so may break the head into a "head" class 515 and a "nose" class 520. Based upon the relative orientation of the "head" class 515 and the "nose" class 520 the system can infer the direction in which the user's head is turned. Since the chest and torso are not generally relevant to the gestures of interest in this example, only broad classifications "upper torso" 525 and "lower torso" 535 are used. Similarly, the details of the upper arm are not as relevant as other portions and so a single class "right arm" 530*c* and a single class "left arm" 530*b* may be used.

In contrast, the lower arm and hand may be very relevant to gesture determination and more granular classifications may be used. For example, a "right lower arm" class 540, a "right wrist" class 545, a "right hand" class 555, a "right thumb" class 550, and a "right fingers" class 560 may be used. Though not shown, complementary classes for the left lower arm may also be used. With these granular classifications, the system may able to infer, e.g., a direction the user is pointing, by comparing the relative orientation of the classified depth points.

Example Depth Data Processing Pipeline

Figure 6:
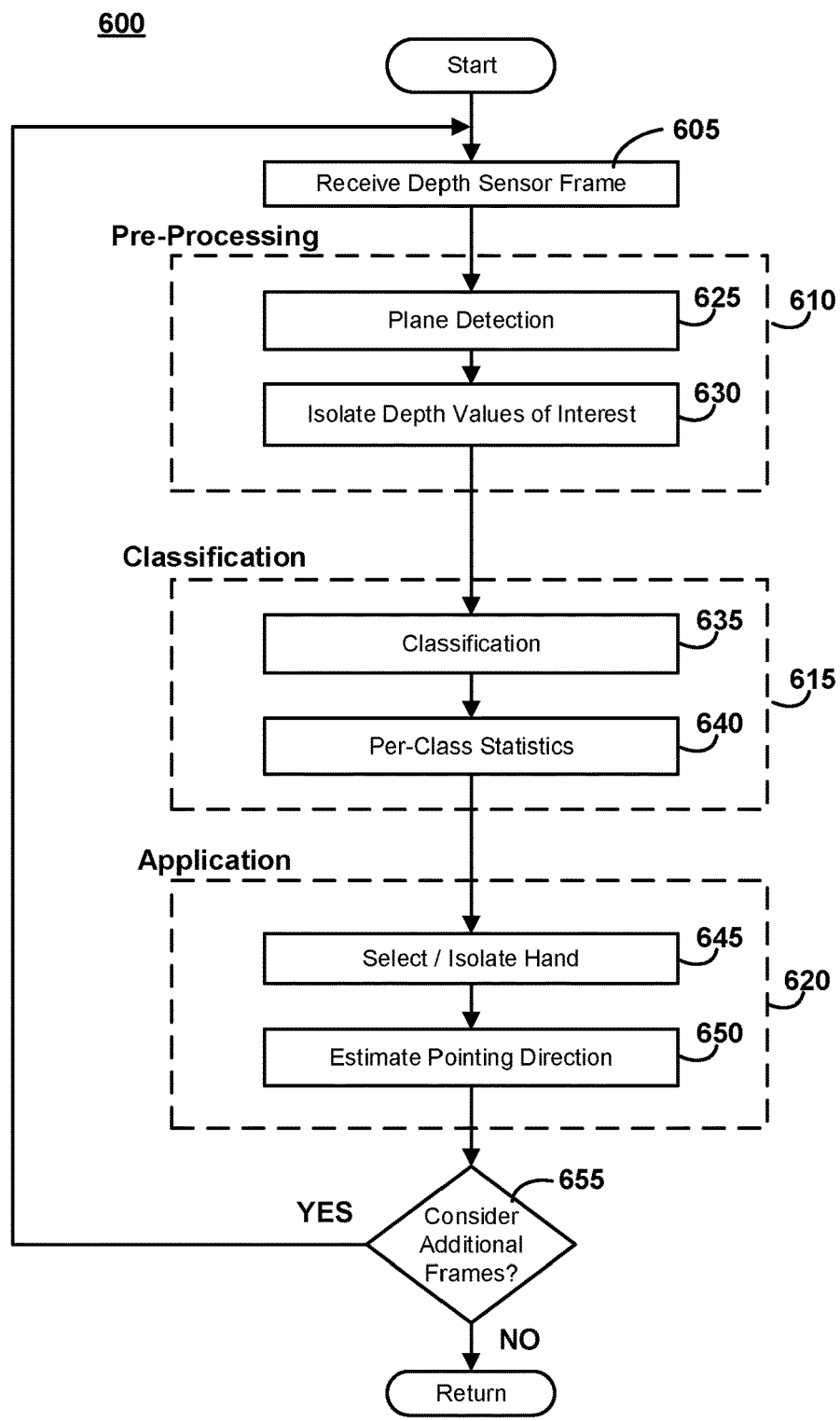
FIG. 6 is a flow diagram illustrating some example depth data processing operations as may be performed in some embodiments.

FIG. 6 is a flow diagram illustrating some example depth data processing operations 600 as may be performed in some embodiments. At block 605, the processing system may receive a frame of depth sensor data (e.g., a frame such as frame 305). Generally speaking, the data may then pass through "Pre-Processing" 610, "Classification" 615, and "Application" 620 stages. During "Pre-Processing" 610, the processing system may perform "plane detection" at block 625 using the frame data or based upon assumptions or depth camera configuration details (though again, in many embodiments preprocessing and plane detection may not be applied). This may include, e.g., the clipping planes discussed with respect to FIG. 4, such as the floor 415 plane and wall plane 420. These planes may be used, e.g., to isolate the depth values of interest at block 630, e.g., as described above with respect to FIG. 4.

During Classification 615, the system may associate groups of depth values with a particular class at block 635. For example, the system may determine a classification using classes as discussed with respect to FIG. 5. At block 640, the system may determine per-class statistics (e.g., the number of depth values associated with each class, the effect upon ongoing system training and calibration, etc.). Example classes may include: Nose, Left Index Finger, Left Other Fingers, Left Palm, Left Wrist, Right Index Finger, Right Other Fingers, Right Palm, Right Wrist, and Other.

During the Application 620 operations, the system may use the class determinations to infer user-behavior relevant to a particular application objective. For example, an HCI interface may seek to determine where the user is presently pointing their hand. In this example, at block 645, the system will select/isolate the depth values classified as being associated with the "hand" and/or "fingers". From these depth values (and possibly depth values associated with the user's arm) the system may estimate the direction in which the user is pointing in this particular frame at block 650 (one will recognize that other gestures than this pointing example may also be performed). This data may then be published to an application program, e.g., a kiosk operating system, a game console operating system, etc. At block 655, the operations may be performed again for additional frames received. One will recognize that the process may be used to infer gestures across frames by comparing, e.g., the displacement of classes between frames (as, e.g., when the user moves their hand from left to right).

Figure 7:
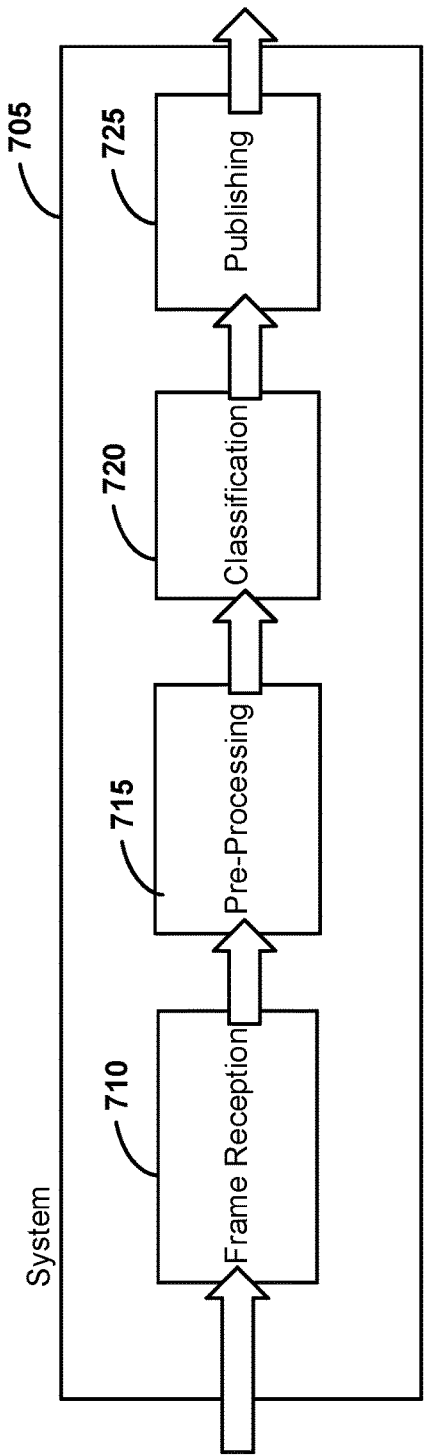
FIG. 7 is a hardware block diagram illustrating an example hardware implementation which may be used to perform depth data processing operations in some embodiments.

FIG. 7 is a hardware block diagram illustrating an example hardware implementation 705 which may be used to perform depth data processing operations in some embodiments. A frame reception system 710 may receive a depth frame from a depth sensor. The frame reception system 710 may be firmware, software, or hardware (e.g., an FPGA implementation, system-on-a-chip, etc.). The frame may be directly passed, or cached and subsequently passed, to a pre-processing module 715. Pre-processing module 715 may also be firmware, software, or hardware (e.g., an FPGA implementation, system-on-a-chip, etc.). The pre-processing module may perform the Preprocessing operations 610 discussed in FIG. 6. The pre-processing results (e.g., the isolated depth values 310*c*) may then be provided to the Classification module 720. The Classification module 720 may be firmware, software, or hardware (e.g., an FPGA implementation, system-on-a-chip, etc.). The Classification module 720 may perform the Classification operations 615 discussed in FIG. 6. The classified depth values may then be provided to a Publishing module 725. The Publishing module 725 may be configured to package the classification results into a form suitable for a variety of different applications (e.g., as specified at 620). For example, an interface specification may be provided for kiosk operating systems, gaming operating systems, etc. to receive the classified depth values and to infer various gestures therefrom. The Publishing module 725, like the other modules, may be firmware, software, or hardware (e.g., an FPGA implementation, system-on-a-chip, etc.).

Example Two-Dimensional Feature Classification Methodology

In some embodiments, classification at block 635 may be performed directly upon the three-dimensional data contained in the depth frame. The depth sensor may have acquired the depth values in the frame in a grid-like collection of detectors. Thus, each "pixel" in the depth frame may be a depth value acquired at a corresponding detector in the grid. If the depth sensor does not provide the depth data in this form, some embodiments may pre-preprocess the data to convert the data to this two-dimensional pixel representation.

Figure 8:
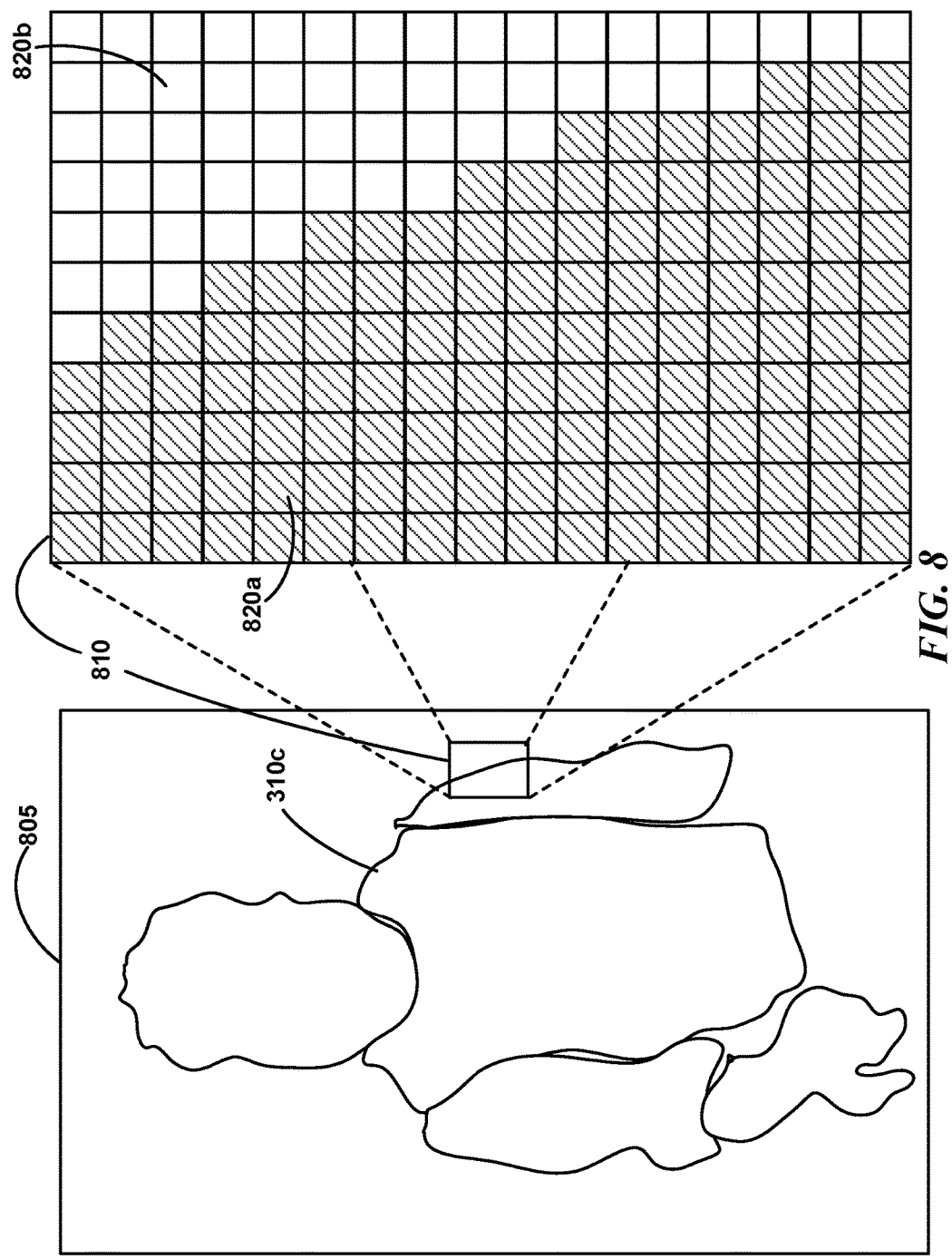
FIG. 8 is a representation of pixels in an example depth data frame as may be acquired by a depth sensor in some embodiments.

FIG. 8 is a representation of pixels in an example depth data frame as may be acquired by a depth sensor in some embodiments. As discussed herein, the depth determinations at each of the detectors in a depth sensor may be output as a two-dimensional grid of depth values (an example of a "depth frame"). Depth frame 805 may thus consist of a large grid of depth values depicting the original depth data 310c (as mentioned, plane-clipping may or may not have been applied). For example, considering the smaller region 810 of the depth frame 805 in an enlarged view, one will readily recognize pixels with relatively short depth values 820a (here depicted as shaded values corresponding to the user's left arm) and pixels with relatively large depth values 820b (here depicted as unshaded values corresponding to the region behind the user, such as a wall). One will recognize that not all the pixels within each of the regions 820a and 820b are likely to exhibit the exact same value. Still, a pixel from one region compared with a pixel from another region will likely exhibit considerable depth disparity. By comparing pixels associated with similar and dissimilar regions, the system may discern the nature of the objects appearing in the depth frame.

Figure 9:
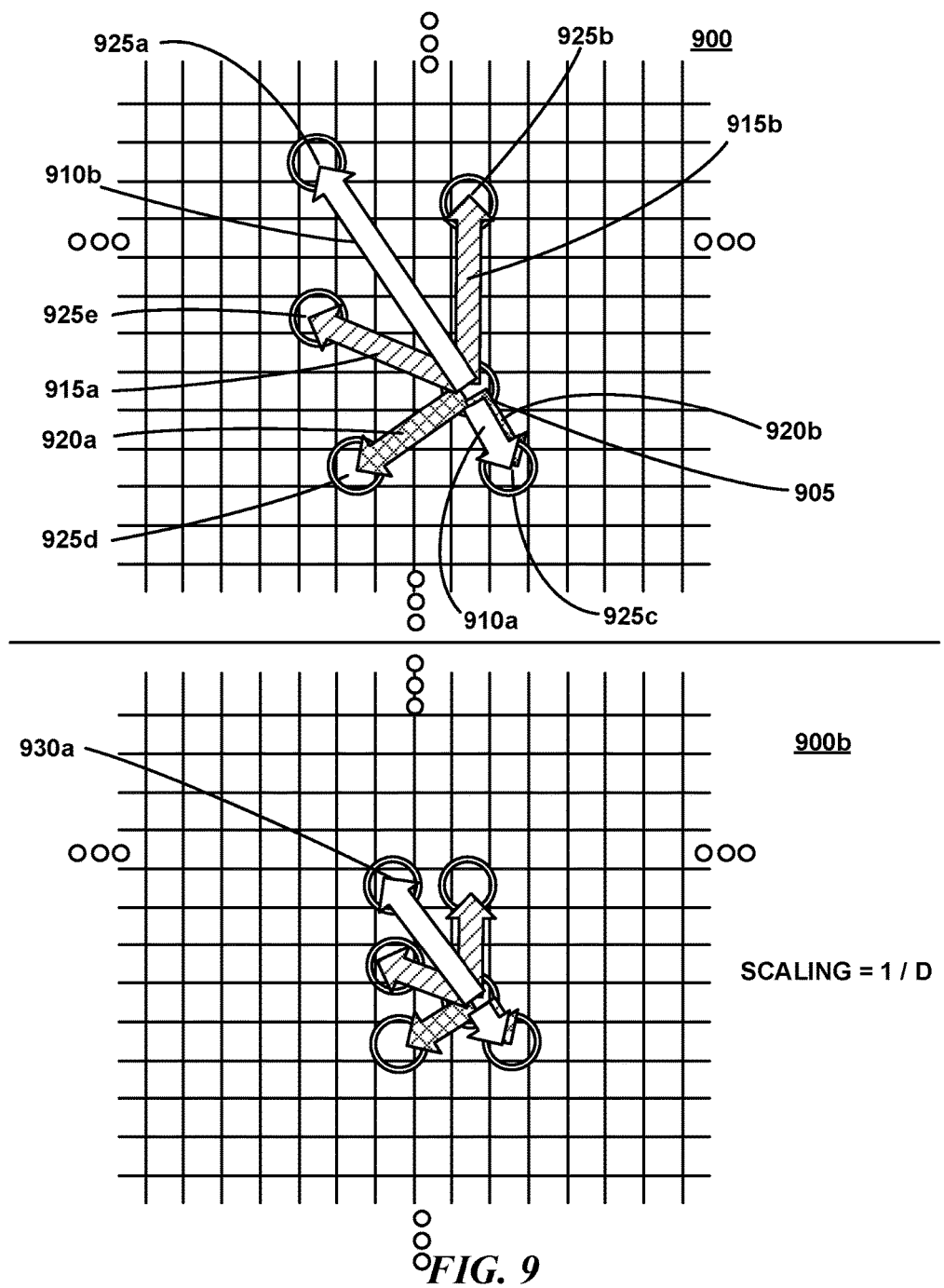
FIG. 9 illustrates several example features on a pixel grid as may be used in some embodiments.

Particularly, classification may proceed using "features" applied to the frame's depth values so as to arrive at a class assignment for each depth point (e.g., as occurred in FIG. 5). A "feature" may be represented in a variety of fashions, but, generally speaking, involves a tool for comparing depth values at two or more pixels relative to the position of a pixel for classification and outputting one or more results. FIG. 9 illustrates three example features on a depth pixel grid 900 as may be used in some embodiments. Though FIG. 9 employs vectors to facilitate understanding, one will recognize that a collection of features could be represented in a variety of manners, e.g., as one or more "templates" centered about a pixel for classification. The templates may be a Cartesian grid indicating which pixels are to be compared—such templates could be passed over the entire depth frame as each pixel in the frame is considered for classification. Thus, the description of a feature as used here, referring to "vector offsets", is merely to facilitate understanding and one will recognize alternative ways for representing such a tool (e.g., features could be an array of offset points, a template moved across the depth frame image, a look-up table of offsets, etc.). Similarly, the two-offset features are described herein, one can imagine features using only one offset or more than two offsets for determining comparisons.

Each feature in FIG. 9 is here represented as a pair of vector offsets. For example, given a candidate point 905 for classification, a first feature may consist of the first offset 910a and the second offset 910b (note that a "candidate" pixel or point, used interchangeably herein, may refer to a point being considered either as part of testing or training operations). These offsets indicate that the pixel depth values at locations 925c and 925a, respectively, are to be compared in determining a classification designation for the pixel 905. For example, if the depth value at point 925c is greater than the value at point 925a, then the feature's result may be "positive". Conversely, if the value at point 925c is less than the value at point 925a then the feature's result may be "negative" (the comparison may not take on these particular values or even be binary, but may employ a range of values in some embodiments). Some features may also consider the depth value at point 905 in their assessment, comparing the depth value at point 905 with one or more of the values at locations 925c and 925a as well. Similarly, an offset vector may be (0,0) implying that it is the value of the depth pixel to be classified that is to be compared. Additionally, one will recognize that features may share offsets, e.g. as shown here between the feature with offset 910a and the feature with offset 920b. Thus, the feature represented by vector offsets 910a,b may be used to compare points 925a,c, the feature represented by vector offsets 915a,b may be used to compare points 925b,e and, the feature represented by vector offsets 920a,b may be used to compare points 925d,c when classifying pixel 905.

In some embodiments, the vector offsets 910a,b, 915a,b, 920a,b may be scaled by 1/depth of the value at point 905, e.g., as shown in scaled representation 900b (note that the pixel grid is not scaled, only the offset lengths). For example, if 'd' is the depth at point 905 and (dx,dy) is the offset vector 910b, then rather than the point 925a, a point at the offset (dx/d, dy/d) may be used for comparison (e.g., the point 930a). Thus, the features may begin with "default" offset values, which may be adjusted based upon the depth value of the current pixel being considered for classification. This scaling behavior may make the feature 'scale-invariant'. For example, an object further from the depth sensor may appear smaller in the depth frame than when the object is closer to the depth sensor. Ideally, pixels associated with the object would still be correctly classified as corresponding to that same object, regardless of the object's distance from the depth sensor. By scaling the offsets to points neighboring the point under consideration, the system may anticipate these effects of perspective.

Figure 10:
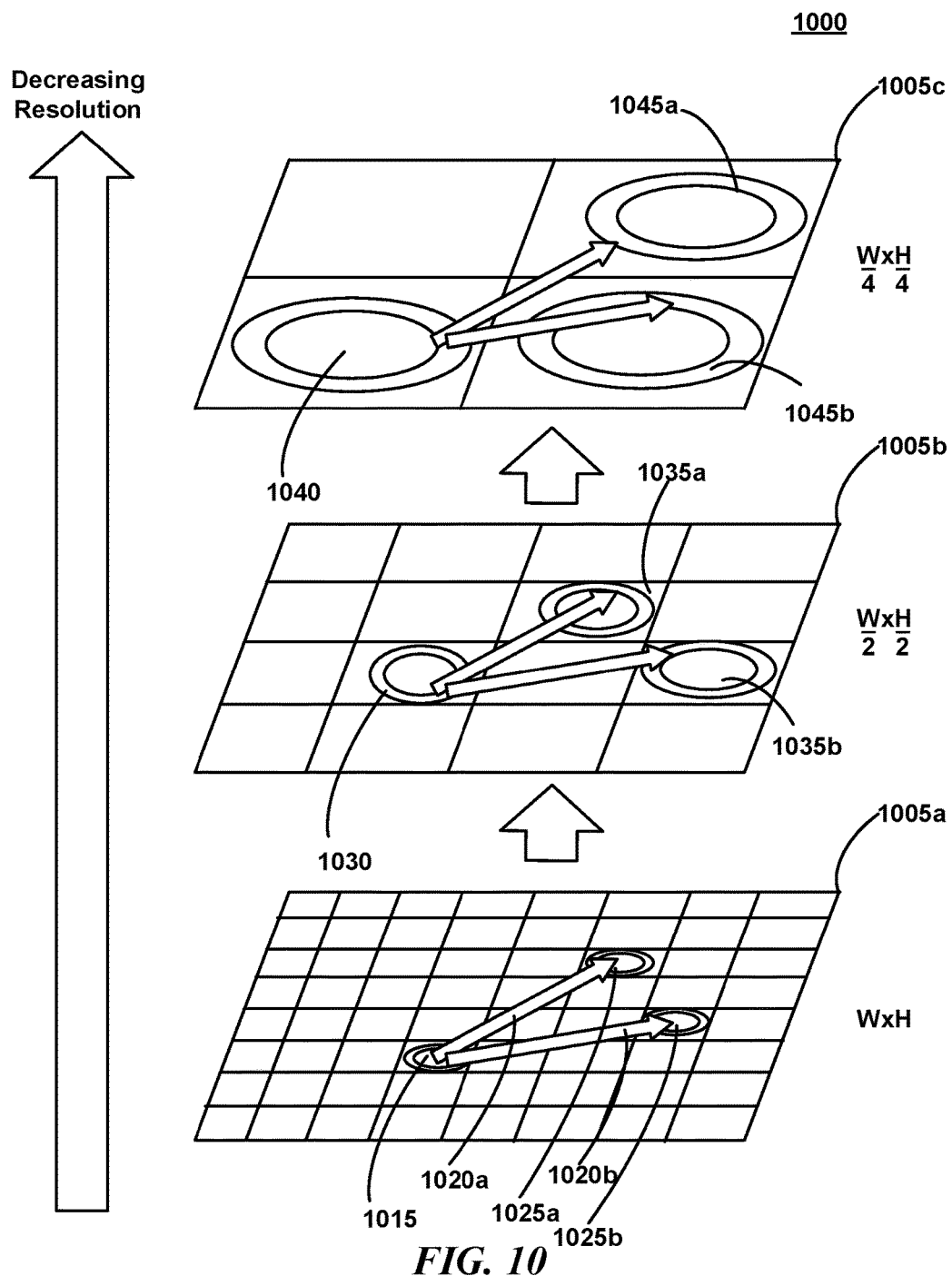
FIG. 10 illustrates the use of features in relation to a depth frame resolution pyramid as may be used in some embodiments.

To economize processing, some embodiments may also apply features to subsampled forms of the original depth frame image. Not only may using subsampled frames increase processing speed, but features used in conjunction with multiple resolutions may result in more accurate classification results. FIG. 10 illustrates the use of features in relation to a depth frame resolution pyramid 1000 as may be used in some embodiments. Given an original depth frame 1005a of pixel dimensions W×H, a feature for classifying candidate pixel 1015 may include vector offsets 1020a and 1020b. In the original depth frame 1005a these offsets may correspond to pixels 1025a and 1025b. In some embodiments, the system may generate or receive from the depth sensor, e.g., subsampled versions 1005b (half-sampled) and 1005c (quarter sampled). For example, the depth values may be averaged among neighboring pixels in original depth frame image 1005a to form a new pixel. Each of these subsampled frames may also be used to inform classification (e.g., as forming their own branches in a tree as described herein). The original offsets 1020a and 1020b may be used as a guide for applying the vectors in these subsampled frames. For example, in subsampled frame 1005b the vector offsets 1020a and 1020b may indicate that classification of subsampled pixel 1030 depends upon the subsampled pixels 1035a and 1035b respectively. Similarly, in subsampled frame 1005c the vector offsets 1020a and 1020b may indicate that classification of subsampled pixel 1040 depends upon the subsampled pixels 1045a and 1045b respectively. In some embodiments, the subsampled images would be used only for classifying the original pixel 1015 (that is, these embodiments would not bother to classify the subsampled pixels 1030 and 1040, but may still consider the comparison of values in the subsampled frames in the classification determination).

Example Two-Dimensional Feature Tree Generation

Although three features were discussed in FIG. 9 to facilitate understanding, many features may be used in a "tree" to more accurately classify a pixel in some embodiments. For example, the features may be applied in succession (e.g., as a template) based upon the results of preceding features in a decision "tree" for classification. FIG. 11 illustrates an example application of features to generate a classification tree as may occur in some embodiments. Given projected depth data 1115, the processing system may iterate over and classify the depth points associated with each pixel. For example, given a depth value corresponding to the position 1105, the system may apply several features 1120a-d and ascertain a classification based upon their cumulative result. A tree 1100a may be used, organizing the feature results into a series of binary classifications. "Feature 1" 1120a may compare, e.g., the depth values at positions corresponding to its offset vectors. If there is a "match" (e.g., if the feature output is positive), then the tree may consider another feature, e.g., Feature 2 1120b which may compare the depth values at Feature 2's 1120b corresponding offsets (had there not been the match, a different feature than Feature 2 may be applied). A successful match with Feature 2 1120b may result in comparison using the values at the offsets of Feature 3 1120c. Conversely, an unsuccessful match may result in a comparison using the offsets of Feature 4 1120d. Eventually, the cascading matches/non-matches will result in a conclusion that the depth value at position 1105 should be classified in one of classes 1125a-c. In some embodiments, all the branches may be considered, and a "likelihood" distribution for each classification formed, based upon the result at each branching.

Particularly, the likelihood distribution may take the form of one or more histograms generated in association with each node in the tree reflecting the distribution of classes encountered by that node during training (one will appreciate that the terms "node", "branching", and "feature" may all be used interchangeably herein and may refer to the same operation or structure within the tree, depending upon the surrounding context). For example, if one tree was trained with one million labeled pixels, and twenty of those pixels reach a specific leaf node of the tree, then that leaf node may store a histogram with total a count of 20, reflecting the per-class distribution of the training pixels reaching that leaf. For a situation involving the classes "Head", "Torso", "Left Arm", and "Right Arm", the leaf's histogram may reflect, for example: 12 "Head" training pixel encounters; 5 "Torso" training pixel encounters; 3 "Left Arm" training pixel encounters; and 0 "Right Arm" training pixel encounters.

Thus, Features 1-4 may comprise a "template" or "corpus" of features that may be considered at each of the points in the image. Though a binary "match/no-match" is provided in this example, one will recognize variations wherein a spectrum of feature outputs may be provided. Such a tree 1100a may be constructed in a variety of manners given one or more training images, e.g., as described with respect to FIG. 12.

Figure 12:
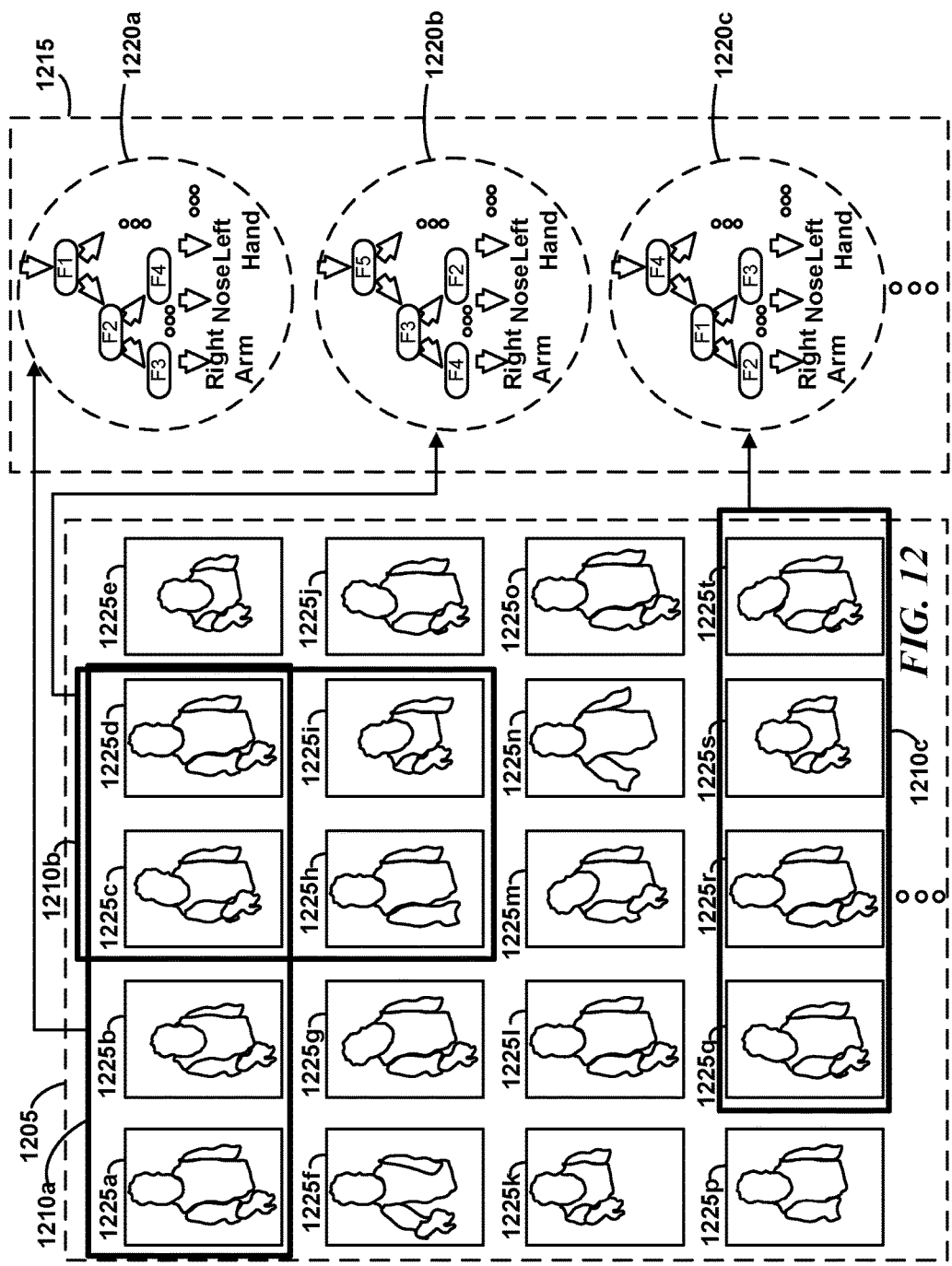
FIG. 12 illustrates an example forest generated from a training set of projected depth images as may occur in some embodiments.

While a single tree may suffice to accurately classify the depth values in some situations, often it may be more robust to use many different trees and to consider all of their outputs. Such a collection of trees may be referred to as a "forest". FIG. 12 illustrates an example forest generated from a training set of projected depth images as may occur in some embodiments. The forest may be generated using a corpus of training images 1205 comprising individual images 1225a-t. The individual images 1225a-t may be of one or more users in different poses. The images in the training corpus may be selected to reflect the spectrum of possible user poses encountered in actual in-situ environments. The depth values in each image may already be classified, e.g., by hand by a human reviewer. Based upon these preexisting classifications the training images may be broken into groups, e.g., groups 1210a-c. These groups may be selected so as to maximize the variance across their training images, to maximize variance between the groups, to recognize a specific pattern, etc. Individual trees 1220a-c may be generated using each of the corresponding training images. For example, one may select a permutation of the feature assignments in the tree that results in the closest correspondence to the correct classification provided with the training data. Such permutations may be identified with the aid of a machine learning or linear programming system in some embodiments. Together, these trees may form a forest 1215 that can be used for in-situ classification. To classify a depth value at a position in the image, the value may be considered by each of the trees and the most frequent classification result among the trees taken as the final classification. One will recognize variations on methods for assessing the tree output to identify a classification, e.g., weighted averages, etc.

A description of forests as may be used in some embodiments may be found in, e.g., "B. Shepherd. An appraisal of a decision tree approach to image classification. In IJCAI, 1983", "J. R. Quinlan. Induction of decision trees. Mach. Learn, 1986", "Y. Amit and D. Geman. Shape quantization and recognition with randomized trees. Neural Computation, 9(7):1545-1588, 1997", or "L. Breiman. Random forests. Mach. Learning, 45(1):5-32, 2001." One will appreciate that various embodiments may employ only some, none, or all of the aspects of these references, e.g., as exemplified by various of the disclosures presented herein.

Figures 13A, 13B, 13C:
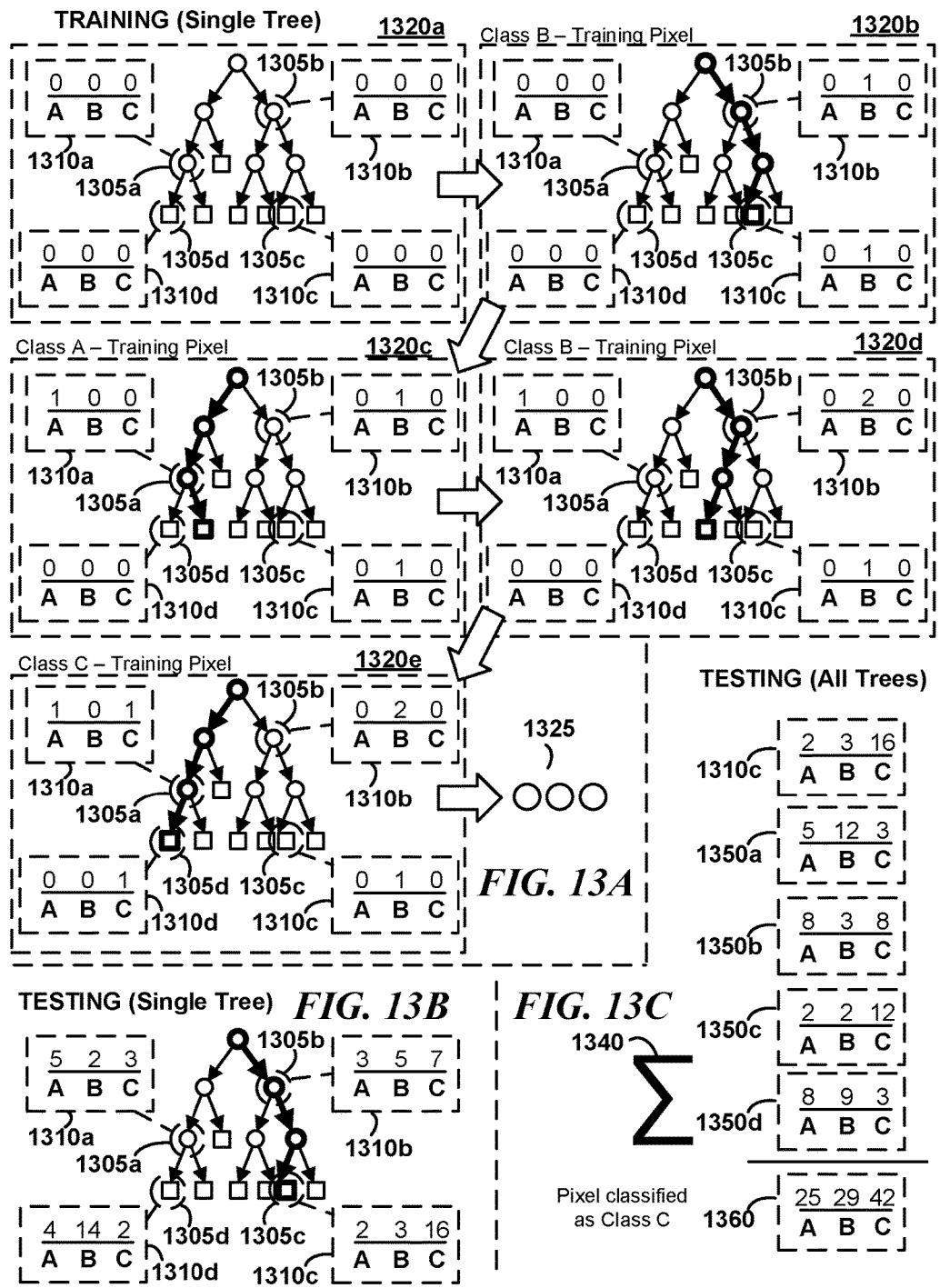
FIG. 13A illustrates an example histogram evolution for a single tree during training, as may occur in some embodiments.
FIG. 13B illustrates an example class determination for a candidate pixel based upon a single tree during testing, as may occur in some embodiments.
FIG. 13C illustrates an example class determination for a candidate pixel based upon a forest of trees during testing, as may occur in some embodiments.

To further facilitate the reader's understanding, FIGS. 13A, 13B, and 13C elaborate upon the tree structure and use during each of training and testing as may occur in some embodiments. Particularly, FIG. 13A illustrates an example histogram evolution for a single tree during training, as may occur in some embodiments. Initially 1320a, the tree may be formed as a permutation of the features, e.g., as was described above for the tree 1220a. Like the tree 1220a, a plurality of training pixels, or entire training images, like group 1210a may be used to train the tree. The tree itself comprises a plurality of nodes, such as nodes 1305a, 1305b, 1305c, and 1305d. Nodes 1305c and 1305d are also referred to herein as "leaves", as they have no further nodes depending from them and are represented by squares rather than circles. Thus, unlike nodes 1305a, 1305b, which correspond to intermediate feature determinations, leaves 1305c and 1305d reflect the results of feature determinations, without any subsequent features to consider.

In some embodiments, each node is associated with a histogram (in some embodiments histograms are not used, in some embodiments only leaves have histograms, etc.). In this example, the node 1305a is associated with the histogram 1310a, the node 1305b is associated with the histogram 1310b, the node 1305c is associated with the histogram 1310c, and the node 1305d is associated with the histogram 1310d. In this example, there are only three classes "A", "B", and "C" (one will recognize that a real-world situation may have many more classes, e.g., "finger", "head", "arm", etc.). Accordingly, in the initial state 1320a, each histogram is zeroed for each class.

In this example, the first training pixel 1320b has been annotated (e.g., by a human) to correspond to Class B. The training system proceeds to make feature determinations based upon the pixel, and possibly its neighbors, to arrive at the path shown in bold (again, features need not relate just to the spatial separation of pixels, but may be, e.g., the luminosity, hue, or saturation of the candidate pixel). For each node in the path, the value for the "B" class is incremented. Accordingly, the histograms 1310b and 1310c have their B value incremented as nodes 1305b and 1305c lie on the feature determined path for the training pixel 1320b in this tree, while the histograms 1310a and 1310d do not have their values incremented as nodes 1305a and 1305d do not lie on the path for the training pixel 1320b in this tree. The process may be repeated for the subsequent training pixel 1320c, whose correct class is Class A. Here, the nodes along the path of matching features (again shown in bold) have the "A" value in their histograms incremented. In the next training pixel 1320d, a Class B pixel, the histograms corresponding to on-path nodes have their "B" value incremented. The training pixel 1320e is associated with Class C and so histograms with on-path nodes now have their "C" value incremented, etc. Ellipses 1325 indicates that this process may be repeated for as many training pixels as are available in the training set, e.g., the group 1210a or 1210b (all, or less than all, of the pixels in each training image may have been annotated). Once all these training pixels are considered, the histograms will have their "final" values that may then be used by the same system, or a separate testing system, in testing.

For example, FIG. 13B illustrates an example class determination for a candidate pixel based upon a single tree during testing, as may occur in some embodiments. Here, a candidate pixel with an unknown classification has been provided to the tree of FIG. 13A following the tree's training as described above. The path corresponding to positive feature determinations is again shown in bold. While some embodiments also consider upstream histograms, in this example only the histogram associated with the determined leaf in the path is used for classification during testing. Particulalry, since the path concludes with the leaf 1305c, the histogram 1310c, may be used to classify the pixel. Thus, this particular tree indicates that Class C is most likely, as it is associated with a largest histogram value of 16 relative to the other classes in the leaf's histogram. However, in some embodiments the system considers the combined histogram values across all trees in the forest to make the final class determination for the candidate pixel, as discussed below with respect to FIG. 13C.

FIG. 13C illustrates an example class determination for a candidate pixel based upon a forest of trees during testing, as may occur in some embodiments. As mentioned with respect to FIG. 13B, the testing system identified histogram 1310c, associated with leaf 1305c, by applying the candidate pixel to the features to the trained tree of FIG. 13A. In the example of FIG. 13C, the forest includes five total trees (though one will recognize that the embodiments may include more or fewer trees in a forest). For each of these trees a leaf histogram was determined, e.g., the histogram 1310c for the tree previously discussed and the histograms 1350a-d for the other trees of the forest. In this example, the histogram values are summed 1340 to generate a summed histogram 1360 (one will readily recognize that this example is merely to facilitate the reader's understanding and that variations will readily exist, e.g., as when the final class determination is made as the most frequent class determination of the individual trees, rather than as the greatest value in a summed histogram). Here the largest value in the summed histogram 1360 is for Class C and so the testing system infers that the forest classifies the candidate pixel as being of Class C.

Figure 14:
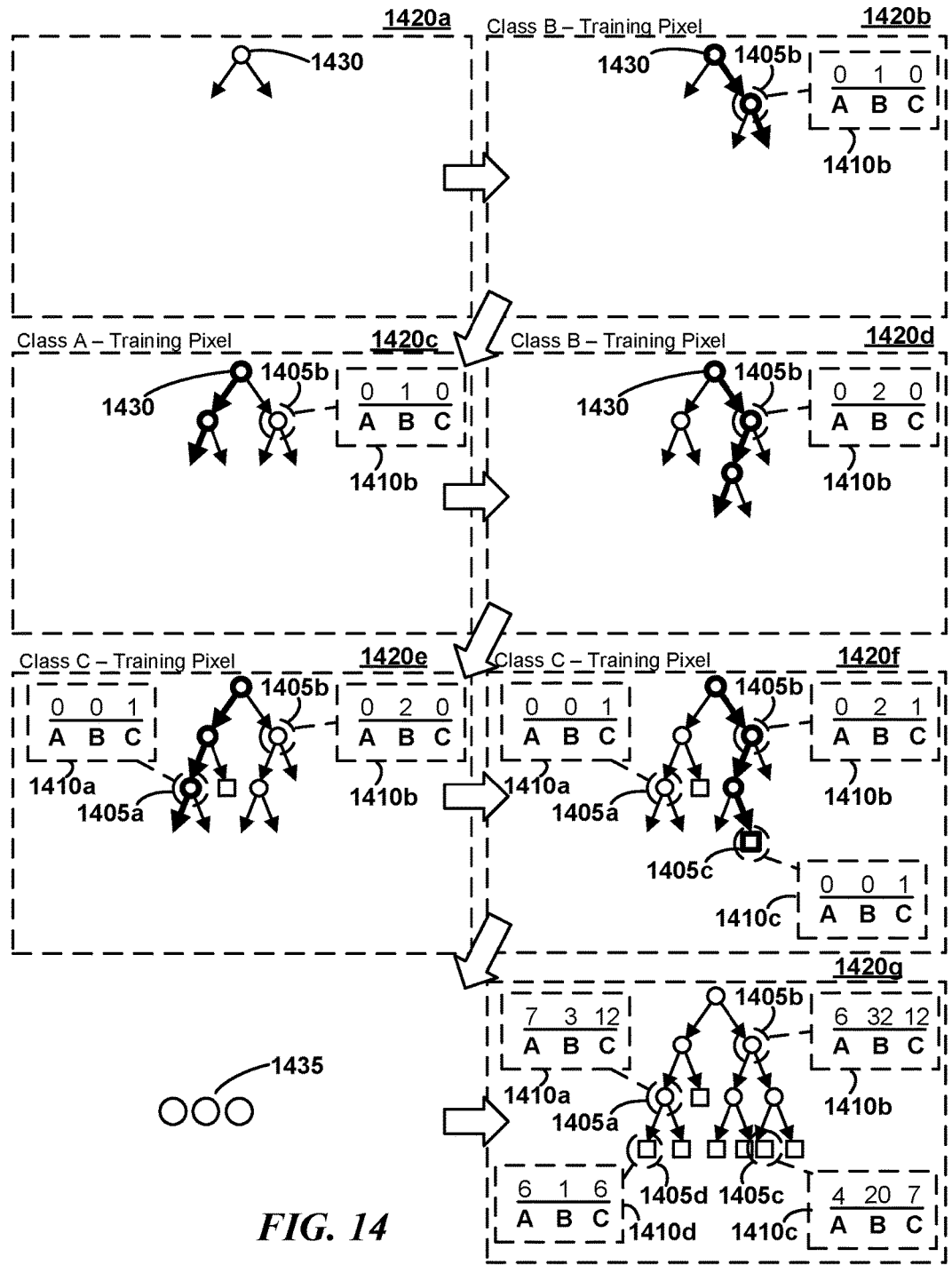
FIG. 14 illustrates another example histogram evolution in parallel with tree generation as may occur in some embodiments.

In some embodiments, histogram and tree generation using features may be integrated into a unified process. For example, FIG. 14 illustrates another example histogram evolution in parallel with tree generation as may occur in some embodiments. Particularly, in some embodiments, the system may generate the trees in parallel with the creation of each node's histogram. This may result in the first nodes in the tree receiving greater influence (as the leaves' histograms have encountered more training pixels during training) than nodes closer to the leaves and, indeed, the leaves themselves (as their histograms have encountered fewer training pixels during training).

For example, consider an initial time 1420a wherein the system has so far selected only a single feature 1430 from the corpus of features to be included in this tree. In some embodiments, the system may select the feature arrangement for a given tree during training by, e.g., considering the arrangements of other trees in the forests, rulesets provided by a human trainer, success rates, etc. Thus, the initial feature 1430 and subsequent features in the tree may be chosen in accordance with multiple criterion, or the system may simply choose them randomly.

When the training system then considers a Class B training pixel at time 1420b, the feature 1430, as evidenced by the bolded path, may determine an edge from the node 1430 corresponding to the feature matching result. A new feature may now be selected and used at node 1405b and a corresponding histogram 1410b generated (one will appreciate that a histogram may also now be generated for node 1430, though not illustrated here to avoid cluttering the figure). Because the system classifies the training pixel as belonging to Class B, the B value may be incremented in the histogram 1410b.

At time 1420c, the system may introduce an A classified training pixel into the tree, resulting in a new path indicated in bold. Again, the system may introduce a new feature at the current tree's leaf (e.g., where the path ends). Though not illustrated here, node 1430's histogram may be updated to reflect the new A classified value. Similarly, the new node may be associated with a new histogram. Conversely, as node 1405b does not fall on this path, the histogram 1410b is not updated. Neither are any new features introduced from node 1405b as it does not fall on the matching feature path.

However, at time 1420d a new Class B training pixel may produce the bolded path of feature matches and the introduction of a new feature node off of node 1405b. As node 1405b now falls on the path, the system may update histogram 1410b. At time 1420e, a Class C training pixel may precipitate a path and the creation of node 1405a as well as corresponding histogram 1410a. In contrast to the histogram 1310a at time 1320e, note that the histogram 1410a at time 1420e does not reflect the preceding Class A path from time 1420c. In this manner, nodes closer to the root of the tree will have histograms reflecting more values than histograms associated with nodes at the leaves. Similarly, at time 1420f the system may consider a Class C training pixel, determine the corresponding path indicated in bold, and introduce new leaf node 1405c and corresponding histogram 1410c. Here, the leaf 1405c is shown as a square to illustrate that the system will not further extend the tree past this leaf. That is, if a subsequent training pixel follows a path reaching this leaf 1405c, the system may update the histogram 1410c, but may not introduce any new dependent nodes from the leaf 1405c.

The system may base its decision to terminate a path in a leaf upon a plurality of factors depending upon the embodiment. In some embodiments, the system may simply enforce a "maximum path length". Once a path has reached this maximum length, the system may forego appending additional nodes. Subsequent pixels with feature matches leading to this leaf node would not then produce further dependencies. In some embodiments, e.g., the example illustrated in FIG. 14, the system may permit different path lengths from the root node to the leaves. These different path lengths may be arbitrary or generated in accordance with various criteria. For example, some features may be pre-designated by a human or machine supervisor as being desirably pre-terminated. That is, a false result for features associated with a first class may negate the need for subsequent consideration of features associated with other classes (e.g., finger-related features may not warrant consideration if a hand-related feature has failed).

As evidenced by ellipses 1435, the system may continue to consider training pixels, generating tree branchings, generating histograms, and updating histograms, until all training pixels, or an acceptable amount of training pixels, have been considered. These additional iterations may precipitate the creation of the leaf 1405*d* and corresponding histogram 1410*d*. Accordingly, after the training system has considered the training pixels, the system may produce a final tree with final histogram values at time 1420*g*. This tree may then be used for testing, individually and as part of a forest, e.g., in the same fashion as in FIGS. 13B and 13C.

Figure 15:
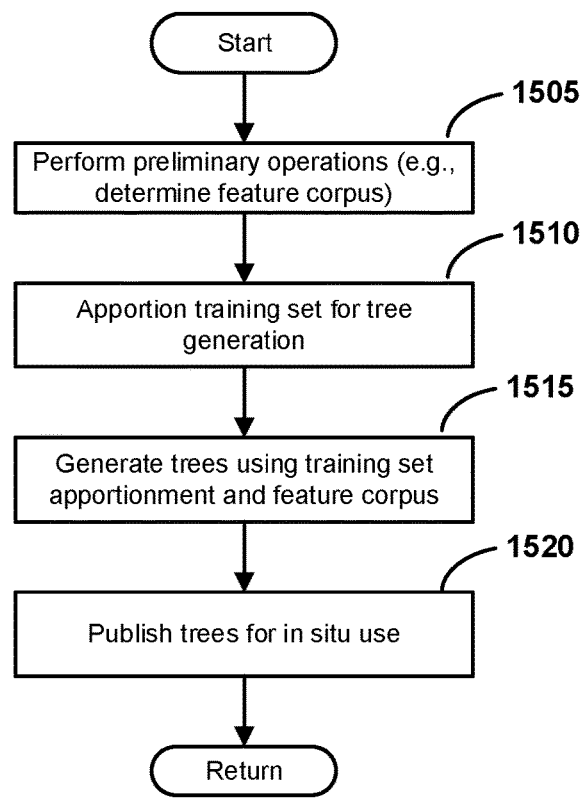
FIG. 15 is a flow diagram illustrating operations in an example forest generation process as may occur in some embodiments.

FIG. 15 is a flow diagram illustrating operations in an example forest generation process 1500 as may occur in some embodiments. At block 1505, the processing system may perform various preliminary operations (e.g., acquiring the training images, determining classifications for the potions of the training images [possibly with human assistance], selecting the corpus of features for use in the trees [different feature subsets may be used for different trees in some embodiments], etc.). As mentioned, the processing system performing these operations may or may not be the same system coupled to the depth sensor described above (e.g., training may occur off-site in a controlled environment). At block 1510, the processing system, possibly with human assistance, may determine groupings of images within the training set for generating the trees. At block 1515, the trees may be generated for each group. For example, multiple feature placements may be tried for the corresponding group of training images and the features placements most closely reproducing the known, correct classifications, used for the tree. The trees may then be organized into a forest and published, e.g., for in situ use at block 1520.

Extended Vectors for Improved Training and Classification

Classifying pixels based directly upon the outputs of a random forest may be less effective than developing a classifier based on some modified output of the forests. For example, Shaoqing Ren, et al. discuss a method for improving random forest classification in their submission "Global Refinement of Random Forest" to the 2015 Computer Vision and Pattern Recognition conference. Such methods may consolidate the forest output to generate a new feature (e.g., a "base vector" as described below). This new feature may then be used both to train a classifier using a machine-learning algorithm (such as a support vector machine, neural network, deep learning network, principal component analysis, etc.) and to classify new pixels. That is, when classifying pixels in situ, the system may again input the newly acquired depth pixel from the in-situ frame into the forest and generate a corresponding consolidated feature. The system may then apply this consolidated feature to the previously trained classifier to determine the proper classification for the corresponding in-situ pixel.

Figure 16:
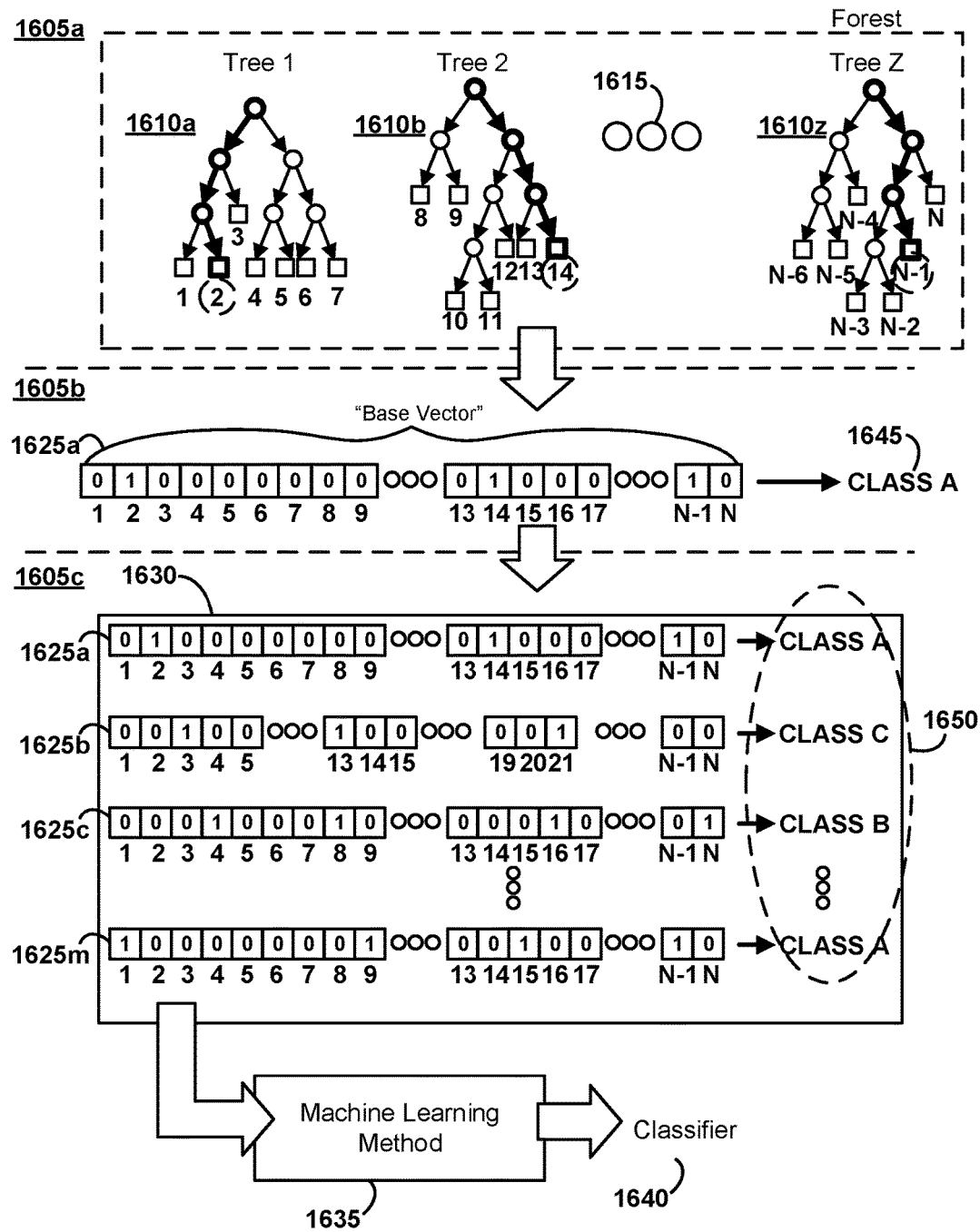
FIG. 16 is a schematic diagram illustrating the generation of a plurality of base vectors from a classification forest for training via a machine learning method as may occur in some embodiments.

FIG. 16 illustrates how these approaches relate to certain of the disclosed embodiments. Particularly, FIG. 16 is a schematic diagram illustrating the generation of a plurality of "base vectors" from a random feature forest for training via a machine learning method as may occur in some embodiments. The trained classifier may then be used to classify unknown pixels encountered in situ (e.g., the unknown pixels may themselves be applied to the forest to generate a new base vector and the trained classifier then applied to that new base vector to determine a class assignment).

The system may begin the training process with a plurality of "training pixels", e.g., depth values from images for which the correct depth value classification for each pixel is already known (e.g., supplied by hand from a human via visual inspection). Consider a single such training pixel. Initially 1605*a*, the pixel may be applied to a plurality of Z trees 1610*a*, 1610*b*, 1610*z* (intervening trees are represented by ellipses 1615) in a forest, previously created using training data as discussed herein. These Z trees may be used to determine a classification for a pixel, e.g., using the methods described above with respect to FIGS. 13B and 13C. Thus, if each tree of the Z trees has the same number of K leaves (one will appreciate that in some embodiments not all the trees have the same number of leaves), then the forest as a whole will have K times Z leaves in total, here represented by the number N (e.g., if K=10 and Z=7, then N=70). Unlike FIGS. 13B and 13C, however, in this embodiment, histograms are not used to determine the candidate pixel's classification (though histograms may be incorporated into some embodiments as discussed elsewhere herein). Instead, the system uses the final leaf on the tree's matching path to assemble a base vector. The base vector is then used in conjunction with a machine learning classifier to determine the appropriate pixel class.

Particularly, each tree may determine an appropriate leaf for the pixel based upon the corresponding path of feature matches at its nodes, e.g., as discussed above with respect to FIG. 13B. Here, the tree 1610*a* has determined that its path for the pixel terminates at its second leaf. Similarly, the tree 1610*b* has determined that its path for the pixel terminates at its seventh leaf (the fourteenth leaf in the forest, when the trees are considered as a sequence). Tree 1610*z* has likewise determined that its path for the pixel terminates at its sixth leaf (the N-1 leaf of the N total leaves in the forest), etc. One will recognize that a leaf's position in the forest will depend upon its tree's placement in sequence relative to the other trees. This sequence may be arbitrary, selected in accordance with the machine learning method to be used, or based on other factors. Additionally, while each tree is shown here having the same number of leaves in this example, one will readily appreciate that the leaf count may vary between trees in some embodiments.

The leaf determinations in each tree of the forest may be subsequently 1605*b* assembled into a "base vector" 1625*a* reflecting whether any given leaf of the N leaves in the forest corresponds to a leaf determination at its tree. For example, the second entry, the fourteenth entry, and the N-1th entry of the base vector 1625*a* all have 1 values in this example, indicating that these entries correspond to the leaf determinations for the paths of the trees 1610*a*, 1610*b*, 1610*z*. Entries corresponding to leaves which were not associated with leaf determinations may receive a 0 (naturally the use of 1's or 0's is arbitrary and one may use any suitable distinguishing number).

Though the base vector is here assembled as a linear array of ones and zeros, one will readily recognize variations. For example, the base vector may alternatively be a correlation matrix reflecting correspondences between the distribution patterns 1620a, 1620b, 1620z of each tree. Nodes above the leaves that fall along the path may be represented as additional entries, or sums, in the vector. Similarly, rather than indicate a 1 or a 0 in each entry, the system may indicate the histogram distribution associated with the leaf node. Such variations may naturally be applied elsewhere herein, where a linear base vector array is again used to facilitate understanding. However formed, in this example, during training the "base vector" 1625a remains associated with the correct classification Class A 1645 by the training data (e.g., the training pixel that generated the base vector was associated with Class A).

In the same manner that the single base vector 1625a was generated for a single training pixel, one may iterate 1605c through a plurality of training pixels (e.g., as part of a training image for which correct classifications are provided, or portions of training images with correct classifications provided) to generate a corpus 1630 of corresponding base vectors 1625a, 1625b, 1625c, 1625m, each associated with their known, correct classification 1650. For example, if there were M training pixels there would be M base vectors generated with M corresponding correct class associations.

The system may then apply a machine learning method 1635 to this corpus 1630 to produce a classifier 1640. For example, a support vector machine, a deep learning network, a principal component analysis approach (e.g., generating a principal component basis from the corpus and then projecting in situ pixel base vectors to determine a "nearest" class as in the preceding work with "eigenfaces"), or any other suitable machine learning technique, may all be used. In this embodiment, the system does not consider the histograms associated with each tree of the forest when generating the base vectors. However, other embodiments may consider the histograms when generating vectors as discussed in greater detail below.

While machine learning using the base vector alone, as discussed above, may produce adequate results in some contexts, some applications benefit from a more rich set of data from which to generate a classifier. Accordingly, some embodiments contemplate appending an "extended vector" to the "base vector" to produce a "combined vector" facilitating the inclusion of additional information in the classifier generation process, as well as the subsequent testing. The machine learning method may use the combined vector, rather than just the base vector, to generate the classifier. In-situ classification (e.g., testing) may proceed by generating both a base vector and an extended vector for each pixel and then submitting the resulting combined vector to the classifier for a class determination.

Figure 17A:
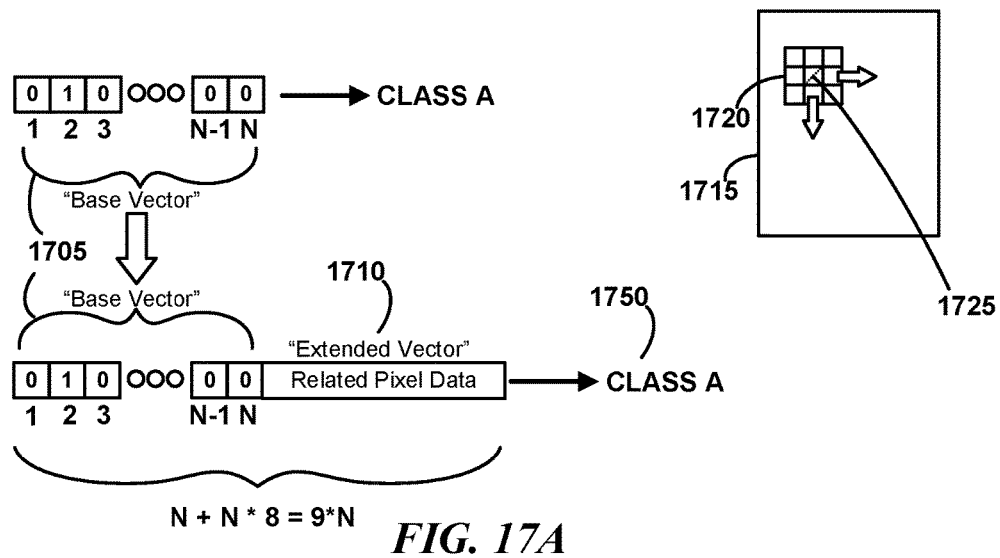
FIG. 17A is a schematic diagram illustrating the application of a related pixel template to generate an extended vector as may occur in some embodiments.

For example, FIG. 17A is a schematic diagram illustrating the application of a related pixel template to generate an extended vector as may occur in some embodiments. While a "template" may refer to an actual structure used to identify related pixels (such as a collection of vector offsets), it may also simply refer to the association between the candidate pixel and its related pixel peers (regardless of any possible physical form, if such a form exists). For example, much like the feature offsets discussed above, the template may simply be a collection of offsets. Initially, the system may generate a base vector 1705 for the candidate pixel in a manner as described above. The system may then append an extended vector 1710 to this base vector 1705 to create a combined vector. In this example, the extended vector 1710 may simply be the concatenated base vectors of the related pixels.

The structure of the extended vector 1710 may vary with how pixels are "related" in the embodiment. For example, pixels may be related by distance, as when pixels directly bordering the considered pixel are considered "related". Such a consideration of immediate neighbors may be visualized as a template 1720 applied to the considered pixel as it appears in the image as a whole 1715. This template 1720 may be "moved" across the image as new pixels are considered. For example, in a given position the template 1720 may consider only pixels directly bordering the pixel under consideration 1725 in a training image. As discussed elsewhere herein, it may be necessary to perform "two passes" of the image data to create an extended vector (the first pass to generate the necessary per pixel base vector information and the second pass to generate the extended vector information by consolidating this per-pixel base vector information via a template).

In the example of FIG. 17A, the extended vector is the concatenation of the base vectors for each neighboring pixel. In other words, since there are eight neighbors to the considered candidate pixel, each neighbor associated with a base vector N entries long (when the base vector is a linear array), the extended vector is N*8 units long. Once concatenated with the original base vector for the considered candidate pixel, one will recognize that the combined vector is 9*N units long. One will appreciate that border pixels may be treated as a special case, or excluded from consideration (e.g., around some fixed pixel perimeter of the image edge) to account for the border pixels having fewer than eight neighbors. Additionally, one should keep in mind that during training, despite the inclusion of this related pixel information from pixels which may be associated with different classes, the class for the considered training pixel has not changed (e.g., in this example, it remains Class A 1750). While a grid of pixels is used in this example, one will recognize analogous concepts for "related" pixels in a point cloud or other format (e.g., the neighbors may be the nearest point cloud points as measured by Euclidean distance to the candidate point).

While a 9*N unit long feature vector in the example of FIG. 17A may suffice for some applications, such a long vector may prove unwieldly or less effective for large numbers of training data and for certain contexts. Not only may training on such large vectors be undesirable, but performing subsequent in situ classification with such large vectors may impose undesirable requirements (e.g., additional memory, processing time, etc.). In addition to the processing time and storage inefficiencies precipitated by a large vector, large vectors may also increase the error rate of some embodiments, such as the method described in FIG. 17A. For example, a long extended vector giving each neighboring pixel the same weight as the candidate pixel may cause the neighboring pixels to exert undue influence over the candidate pixel in the machine learning method. Accordingly, some embodiments anticipate combining the related data information into a "merged" extended vector, which is also suitable for training a machine learning classifier. While the related pixel data may be merged, rather than concatenated, the resulting merged extended vector may itself be concatenated to the base vector for the candidate pixel to form a combined vector.

Figure 17B:
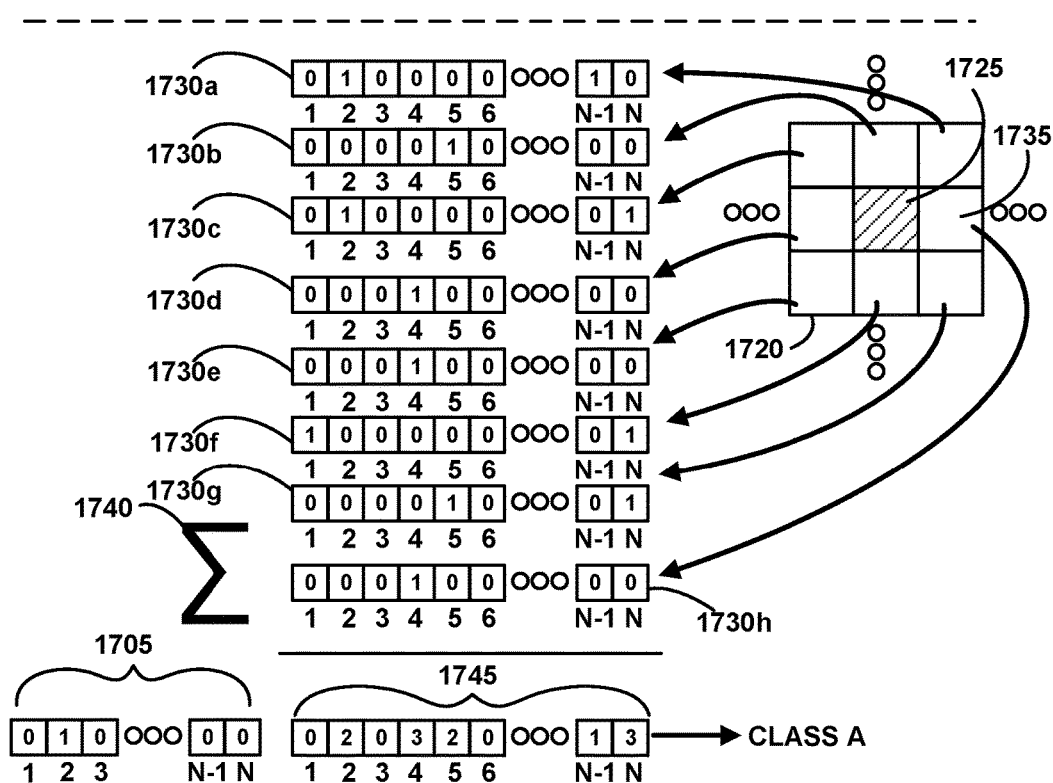
FIG. 17B is a schematic diagram illustrating the creation of an merged extended vector from a pixel template as may occur in some embodiments.

FIG. 17B is a schematic diagram illustrating the creation of a merged extended vector from a pixel template as may occur in some embodiments. In the example of FIG. 17B, the merging proceeds by the sum 1740 of the base vectors 1730a-h corresponding to each neighboring pixel (e.g., neighboring pixel 1735 corresponds to base vector 1730h). The system may consider the base vectors regardless of the neighboring pixel's class (though in some embodiments the class may be considered in determining which vectors to merge or how to merge them).

In this manner, the system may form the resulting merged extended vector 1745. In this example, three neighbors had feature matching paths leading to the Nth leaf of the forest and so the summed value for the Nth entry in the extended vector 1745 is a 3. Similarly, three neighbors shared an entry in the fourth leaf, two neighbors in the fifth leaf, and two neighbors in the second leaf, etc. The resulting merged extended vector 1745 is of length N rather than 8*N, resulting in a combined vector length of 2*N, which is often much more manageable for some applications and contexts.

While a template considering only pixels directly bordering the candidate pixel is considered in this example, one will appreciate that some embodiments employ templates that consider fewer or more pixels than those immediately bordering the pixel under consideration. Similarly, though the neighbor's base vectors are summed in the above example, one will recognize variations wherein the neighbors are filtered or modified as part of the merging process and may be merged other than by summing.

Figure 18:
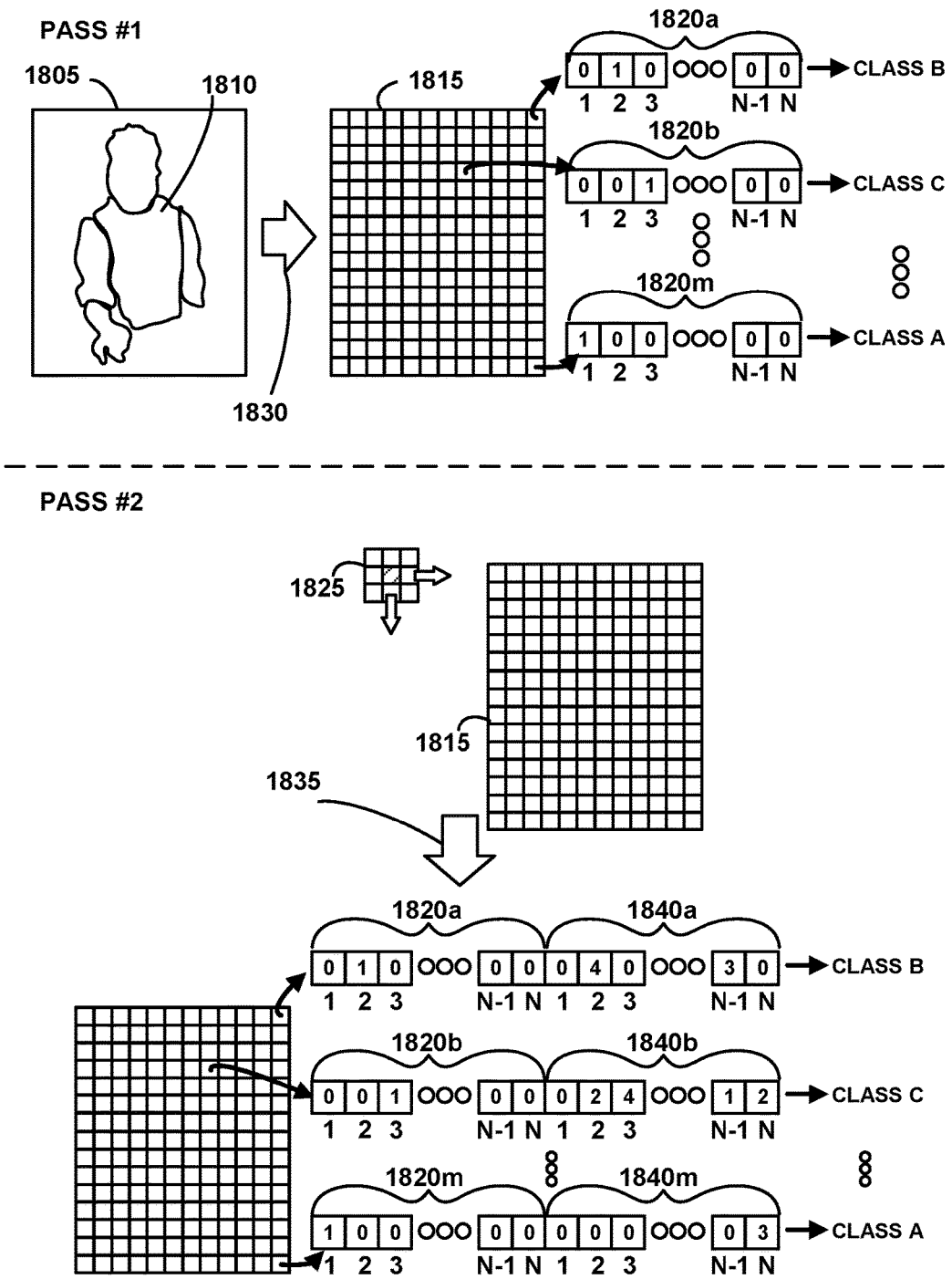
FIG. 18 is a schematic diagram illustrating a first and second pass through a training image to generate training vectors having both base and extended portions, as may occur in some embodiments.

Extended Vectors for Improved Training and Classification—Example Creation

Where the extended vector is generated using the base vectors of related pixels, it may be desirable for the system to process training and in-situ depth images in a series of two or more "passes". That is, the system may first determine the base vectors for the relevant pixels, so that they may be used in generating the extended vector for the related pixels to each considered candidate pixel. FIG. 18 is a schematic diagram illustrating a first and second pass through a training image to generate combined training vectors having both base and extended portions, as may occur in some embodiments.

Particularly, given a training image 1805 having depth values 1810 the system may iterate 1830 through the pixels as though they were entries in a traditional two-dimensional image 1815. The system may generate 1835 a base vector and note the corresponding proper class for each pixel (for the in-situ image during testing, the class assignment will not yet be known). For example, base vectors 1820a, 1820b, 1820m may be generated for each of the corresponding pixels.

After considering each pixel in the first pass though the image 1805, the system may then again iterate through the image 1805 in a second pass applying, e.g., a template 1825, or any other suitable mechanism for considering related pixels to a candidate pixel under consideration, to the pixel grid 1815 (again, in lieu of a two dimensional grid and template, a Euclidean distance and point cloud, etc. may be used). In this manner a plurality of extended vectors 1840a, 1840b, and 1840m, (e.g., merged extended vectors) may be generated and appended to their corresponding base vectors 1820a, 1820b, and 1820m, to form a plurality of combined vectors. For a training image, these combined vectors may each be associated with a correct classification for the corresponding considered candidate pixel. For in situ classification, the system (e.g., the system 250) may provide these combined vectors to the trained classifier for classification. Again, note that the computer system used for training may not be the same system as the system used in-situ.

Figure 19:
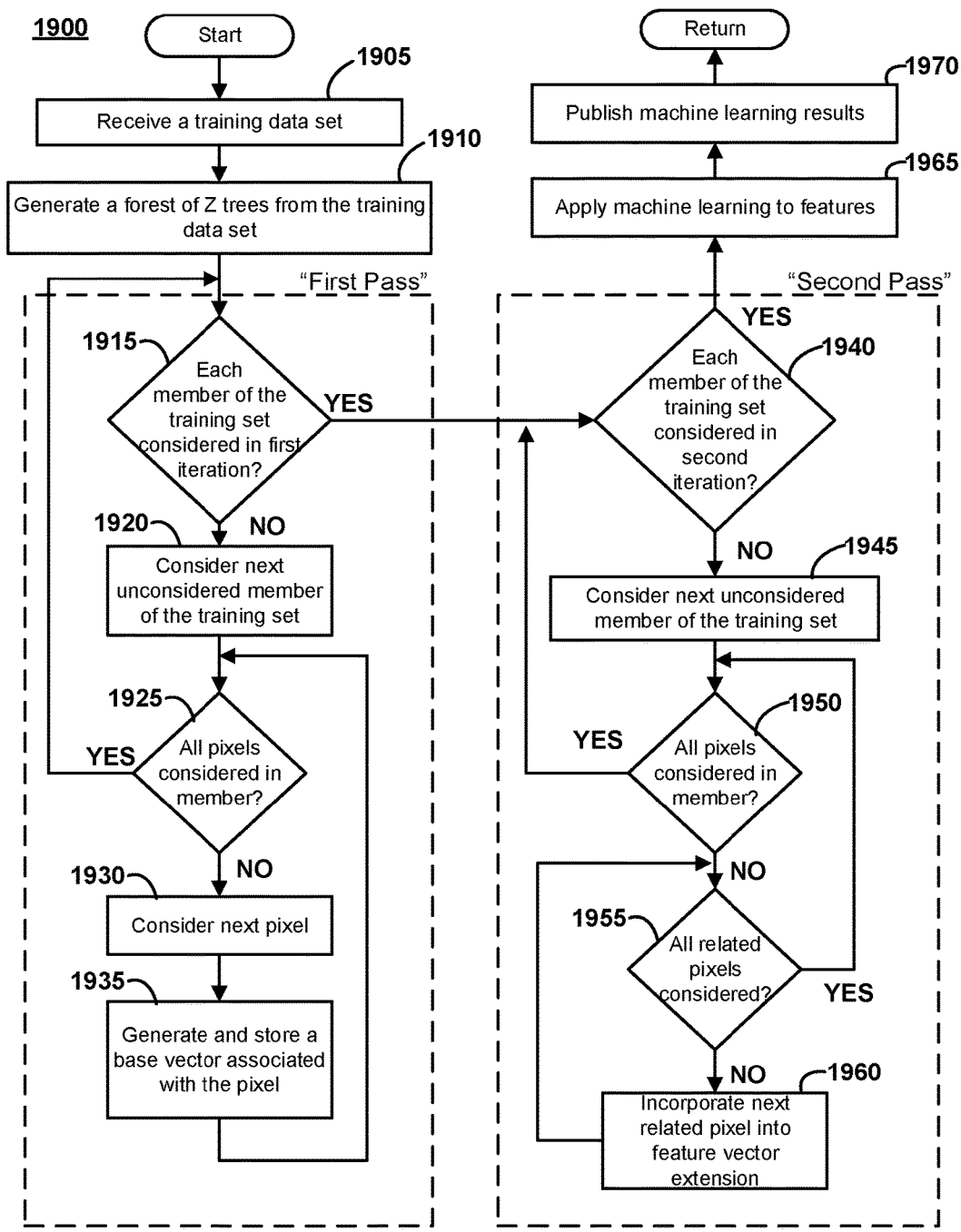
FIG. 19 is a flow diagram illustrating certain features in an example two-pass training vector generation method, as may be implemented in some embodiments.

FIG. 19 is a flow diagram illustrating certain features in an example two-pass training vector generation method 1900, as may be implemented in some embodiments. At block 1905, the system may receive the training data set. This data set may include a plurality of images, or image portions, with the pixels already classified (e.g., by visual inspection by a human). Using portions of the training data, the system may generate a forest of Z trees at block 1910, e.g., as described above in FIG. 12.

During the first pass through the training set items, at block 1915 the system may consider whether each image of the set has been considered (during in situ testing, in contrast, only one image, or frame, at a time may be considered). If not all the images have been considered, then at block 1920 the system may consider the next unconsidered member of the training set. Until all pixels of the member image have been considered at block 1925 (note that in some training sets, less than all pixels in an image may be classified and intended for use in training), the training system may consider the next training pixel at block 1930 and generate a base vector for that pixel at block 1935. Once base vectors have been generated for all the pixels in the training set in this manner for the first pass, the system may proceed to the second pass and block 1940.

Until all members of the training set have been considered in the second pass at block 1940, the system may continue to consider the next unconsidered training set member at block 1945. The system may consider all pixels for that member at block 1950. For each pixel related to the considered pixel at block 1955, the system may incorporate the related pixel at block 1960. This incorporation may take the form of a concatenation, a merging, an updated extended vector content, etc. as described herein.

Once the first and second passes are complete, the system may be in possession of a combined vector having both base and extended components for each training pixel. Therefore, at block 1965 the system may submit these combined components and the corresponding classes to the machine learning algorithm of choice to generate a trained classifier. The trained classifier may then be "published" (e.g., marked for in situ use) by the system or a related system at block 1970.

For in situ testing, one will appreciate that a similar process may be applied, where, e.g., in lieu of applying machine learning methods at block 1965, the system instead submits the generated combined vectors to the classifier for classification.

FIG. 20 is a pseudo-code listing illustrating an example implementation of a two-pass training vector generation method, as may be implemented in some embodiments. Variables are reflected in bold in the listing. One will recognize that many of the structures and control flow operations depicted in this example are arbitrary and that the disclosed embodiments encompass implementation variants achieving substantially the same effect.

At line 1, the system may receive an array of training images. This array may include both the depth pixels and their correct classifications for each pixel (e.g., hand, nose, head, neck, chest, etc.).

At line 3 these training images may be broken into subsets, e.g., as described above with respect to FIG. 12. For example, random subsets between a minimum and maximum size may be drawn from the training_images to produce the subsets. At lines 5-6 these subsets may be used to generate trees, which may themselves be organized as a forest.

At lines 8-17, the system may perform the "first pass", iterating through the training images and creating base vectors for each training pixel within each such image. Particularly, at lines 11-16, the system may iterate through a training image's pixels, and apply each pixel to the forest at line 13 to generate a plurality of leaf values. These leaf values may then be stored as a base vector. The system may also note the class associated with this base vector at line 14.

Once the first pass is completed, and the base vectors are available for the training images, in this example, the system may then perform the second pass at lines 19-32. That is, for each pixel in each training image the system may determine the related pixels at line 24 (e.g., by identifying neighboring pixels, such as may be evidenced by a template). For each of these related pixels at lines 25-29, the system may acquire the data for the related pixel (e.g., the corresponding base vector determined in the first pass) and may incorporate that data into the extended vector for this pixel under consideration at line 28 (e.g., adding the related pixel's base vector to a sum of the other related pixels' base vectors).

Once the system has determined the base vectors and extended vectors for each training pixel, the system may supply them as combined vectors, as well as the corresponding correct classification information, to a machine learning system (e.g., a deep learning tool such as TensorFlow™, a support vector machine, etc.) at line 33. This will produce a trained classifier, which may then be returned for use during in-situ testing.

As mentioned herein, one will recognize that this example is merely provided to facilitate understanding and that more steps, less steps, or steps organized in a different fashion may be readily performed in a real-world implementation using an actual software language.

Figure 21:
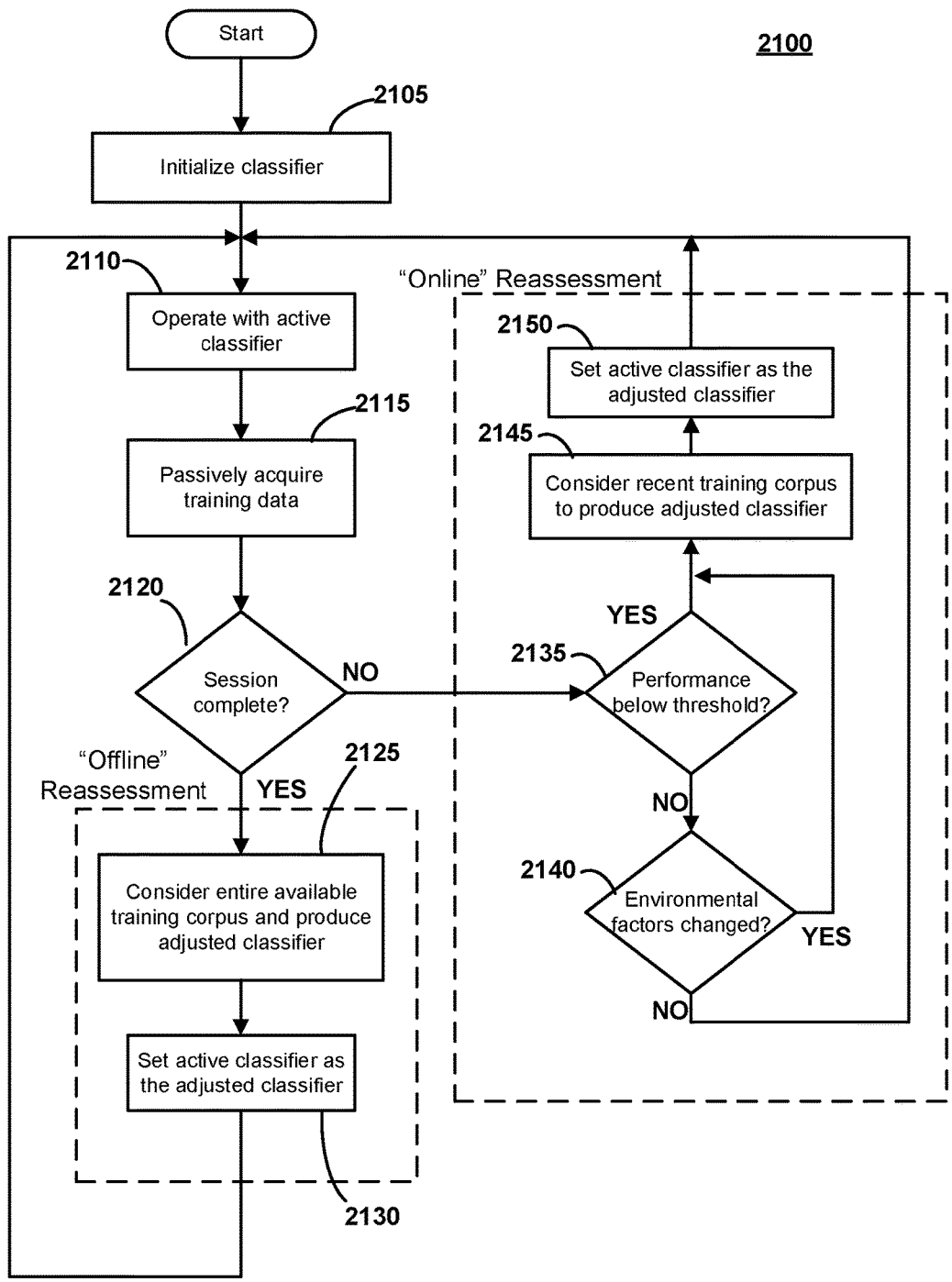
FIG. 21 is a flow diagram illustrating an example iterative in-situ training method, as may be implemented in some embodiments

Extended Vectors for Improved Training and Classification—Example In-Situ Optimization While many embodiments contemplate preparation of a classifier as described herein and subsequent application of that classifier in situ without further optimization, some embodiments also anticipate on-site adjustments to the classifier to further improve accuracy. For example, FIG. 21 is a flow diagram illustrating an iterative in-situ training process 2100, as may be implemented in some embodiments.

At block 2105, the system may initialize the classifier. For example, the system may generate (e.g., using the first and second pass method described above with a support vector machine as the machine learning algorithm), receive, or consult a pre-stored classifier. The system, or a human developer, may select the initial training images for this initial classification in anticipation, for example, of a wide variety of installation environments for the deployed system. In contrast, the subsequent iterative training may help accommodate the deployed system to the particular characteristics of its situation (e.g., the initial training data may anticipate both adult and child users generally, while a system installed in a pre-school will gradually adapt itself to the more specific recognition of child users, a system in a hospital rehabilitation ward to disabled users, etc.).

At block 2110, the system may begin on-site operation with the active classifier, which initially, may be the initial classifier generated as described above. During this operation, however, at block 2115 the system may passively acquire additional "training data" though it may not have been explicitly identified as such by a human user. For example, where the system is being used to help a user navigate a menu, it may be readily apparent when the interaction is successful and when it is unsuccessful (e.g., user expressions, the completion of a purchase, etc.). The system may confer with a separate system to this end. For example, a successfully placed shopping order, a prolonged user interaction, positive expression recognition in the user (or at least the absence of negative expressions), the absence of hostile gestures, etc. may all be used to infer whether the interaction was "successful" or "unsuccessful". The system may accumulate classifications and the corresponding depth values acquire in-situ associated with the "successful" interactions as in-situ training data.

Eventually, at block 2120, the system may complete a "session" (e.g., a full day of operation, a week of operation, a manual reset by an operator, etc.). When such a session is complete, the system may perform an "offline" reassessment of its performance. Such a reassessment may consider the entirety of the training corpus available to the system at block 2125, including e.g., the original corpus, the passively acquired corpus, and training corpuses from any other sources (such as corpuses from other local systems as transmitted over a wired or wireless network connection). In some embodiments, the system may "prune" this consolidated training corpus, prioritizing more recently acquired data over older, or original, training data. The adjusted classifier resulting from the application of this new training data may then be set as the active classifier for use in the next session at block 2130.

In some embodiments, even when the session is not complete, the system may be prepared to adjust its classifier in anticipation of considerations local to its deployed environment. For example, if the system determines, or is advised by a user, at block 2135, that performance is below a threshold, it may proactively initiate a classifier reassessment by performing a new training round. Similarly, if the system determines at block 2140 that environmental factors have changed significantly (e.g., an accelerometer indicates that the system has assumed a new orientation, stationary objects in the system's field of view have been removed, humidity or particle density affecting depth sensor resolution has changed, etc.) the system may also self-initiate a training reassessment.

When an online reassessment is performed, at block 2145 the system may consider a more recent training corpus to generate a new classifier. For example, because the deficiency is a result of immediate factors, the original training data is less likely to be relevant in addressing whatever issue has arisen. Accordingly, the system may give greater priority to the recently, passively acquired data at block 2115 as compared to the previously acquired training data. Where systems are sharing training data, e.g., the system may seek out training data from systems experiencing similar changes in their environment. At block 2145, the system may use this dataset to train a classifier using the methods described herein. At block 2150, the system may set the updated classifier as the active classifier for use in the session going forward.

As indicated in the example of FIG. 21, some embodiments anticipate many iterative training sessions. Accordingly, the optimized and more efficient methods for preparing merged extension vectors as discussed herein may be desirable for achieving this functionality.

Figure 22:
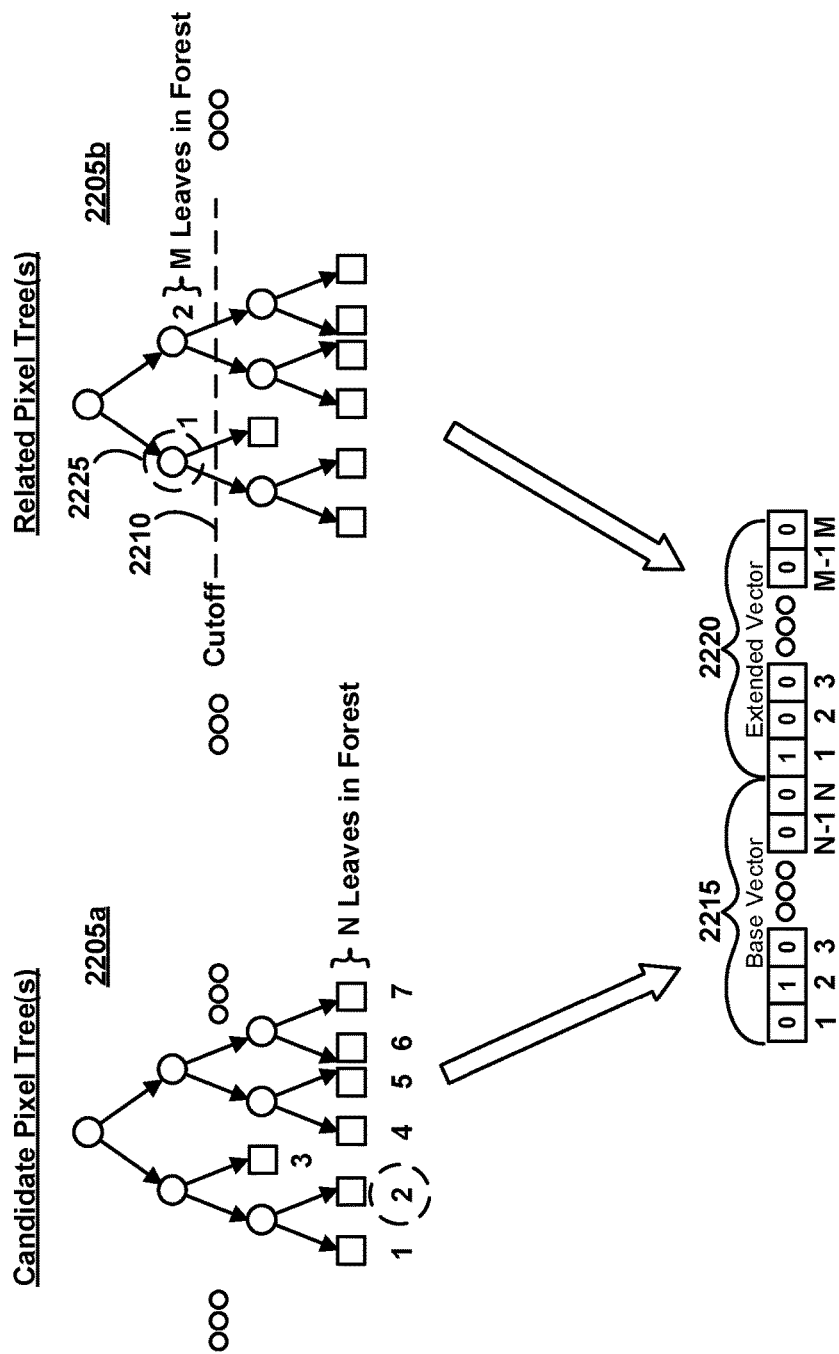
FIG. 22 is a schematic diagram of a granularity cutoff as applied to extended vector generation, as may occur in some embodiments.

Extended Vectors for Improved Training and Classification—Example Granularity Optimization As indicated in the example of FIG. 21, rapid classifier retraining may be explicitly contemplated in some embodiments. For large forests with complicated trees, this process can be very resource intensive. Accordingly, some embodiments anticipate adjusting the granularity with which trees are considered when producing vectors during training and testing. For example, FIG. 22 is a schematic diagram of a granularity cutoff as applied to extended vector generation, as may occur in some embodiments. As mentioned elsewhere herein, not every pixel in a training image may be a training pixel. For example, a human may have manually identified classes for a handful of significant pixels and elected not to annotate the remainder. In such situations, rather than generating the base vectors for construction of an extended vector in a first and second pass, a single pass may suffice (as only a handful of non-training candidate pixels may need their base vectors determined). In these situations, it may be possible to save time and memory resources by considering less than all the potential classifications in the related pixel's trees.

In the depicted example, during training or testing, a candidate pixel is applied to the trees in the forest in each tree's entirety 2205a to achieve individual results for all N leaves (N being again the number of classes times the number of trees in the forest, here, the total number of leaves). In contrast, when determining the leaves for a related pixel, only some portion of the tree 2205b above a "cutoff" level 2210 may be considered. The tree at this cutoff level will have only M, rather than N, "leaves" (nodes appearing higher in the tree than the actual leaves), where M<N. Thus, the resulting extended vector 2220 when merging related pixels, will have a smaller length than the base vector 2215. Analogous to the method for a full tree, the extended vector would here indicate which node of the nodes at the cutoff level was associated with the highest probability (e.g., node 2225).

Figure 23:
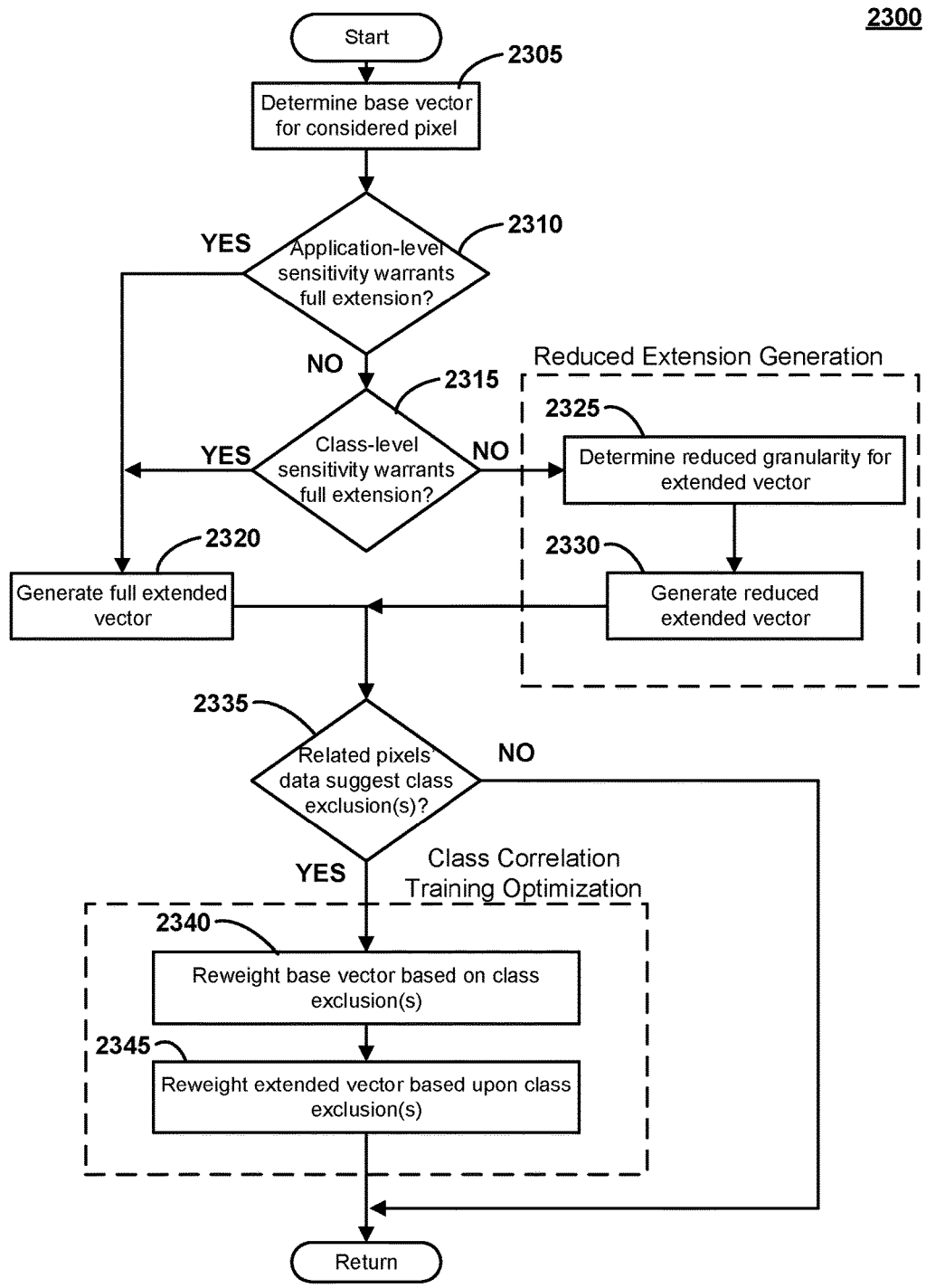
FIG. 23 is a flow diagram illustrating an example method for optimizing related pixel incorporation into an extended vector, as may occur in some embodiments.

The system may apply this granularity-based optimization of the related pixels based upon a variety of factors. FIG. 23 is a flow diagram illustrating an example method 2300 for optimizing related pixel incorporation into an extended vector, as may occur in some embodiments. For example, the operations of FIG. 23 may occur as part of, or in relation to, block 1960 in some embodiments.

At block 2305, the system may determine the base vector for the candidate pixel (e.g., as previously determined in a first pass, or by applying the candidate pixel to the forest). At block 2310, the system may determine if the application in use warrants higher extended vector sensitivity (e.g., using the full trees in the forest without applying a cutoff). For example, an offline reassessment as in FIG. 21 may be able to afford greater time and memory resources than an online reassessment. Similarly, some applications (recognition of user presence) may require less detail to identify classes than other applications (finger-based gesture recognition). Even if the application does not warrant a full extended vector of length N at block 2320, at block 2315 the specific classes of the training task may warrant such a full consideration. For example, some classes may be less susceptible to overfitting by the machine learning system than others, and so less granular vectors may be appropriate. Similarly, in situations where some classes are quite similar, additional detail in the extension vector may help avoid misclassification.

When a reduced extension vector is appropriate, the system may determine the appropriate granularity cutoff at block 2325. This may be based, e.g., on a table of values determined based upon the resources available, the nature of the classes, and the original tree depth. At block 2330, the system may determine the reduced extended vector for the related pixel data.

In some embodiments, at block 2335, the system may consider whether to consider inter-class relationships when optimizing the training classifier. This may be especially useful where the related pixels are related to the candidate pixel by distance, as when they are pixels neighboring the candidate pixel. For example, when classifying a head and a foot, it is extremely unlikely (in most orientations) for the system to encounter a frame having a foot depth pixel adjacent to a head depth pixel. Treating such a classification as equally likely as a neck classified pixel appearing adjacent to a head classified pixel may be illogical. Accordingly, the system may reweight the base or the extended vectors at blocks 2340 and 2345 to avoid creating a classifier that considers such results equally likely. One will recognize that in some embodiments, adjustment of the classifier, after creation, may be a more economical method for pruning such unlikely class correlations.

Figure 24A:
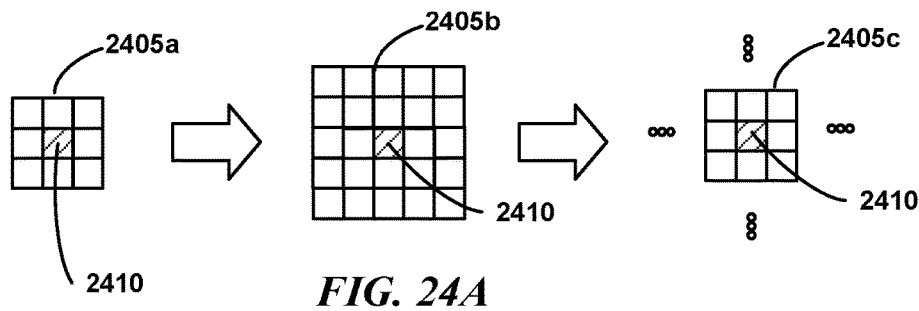
FIG. 24A is a schematic diagram representing different related pixel template sizes, as may be used in some embodiments.

Extended Vectors for Improved Training and Classification—Extended Vector Scope

Where the related pixels are related by distance, as when they are pixels neighboring the candidate pixel, the number of neighbors considered may influence the quality of the results. For example, FIG. 24A is a schematic diagram representing different related pixel template sizes, as may be used in some embodiments. A smallest template 2405a considers only the eight immediate neighbors to the candidate pixel 2410. A larger template 2405b, may consider an additional layer from the candidate pixel, for a total of twenty four total related pixels. Indeed, an arbitrary number of related pixels may be considered when forming the extended vector, as in the case of template 2405c, so long as the pixels are fewer than the total number of pixels in the image.

Figure 24B:
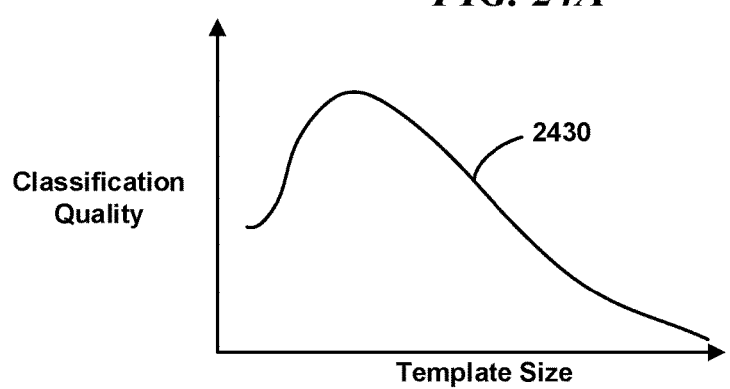
FIG. 24B is a plot illustrating the effect of increasing pixel template sizes to classification quality, as may be occur in some embodiments.

However, there may be an "optimal" template size, depending upon the classes and their relations to one another. FIG. 24B is a plot illustrating the effect of increasing related pixel template sizes to classification quality, as may be occur in some embodiments. As indicated by the generalized plot 2430, classifier accuracy tends to initially increase when additional neighboring pixels are included in the extended vector, but to then produce diminishing classification accuracy.

Figure 24C:
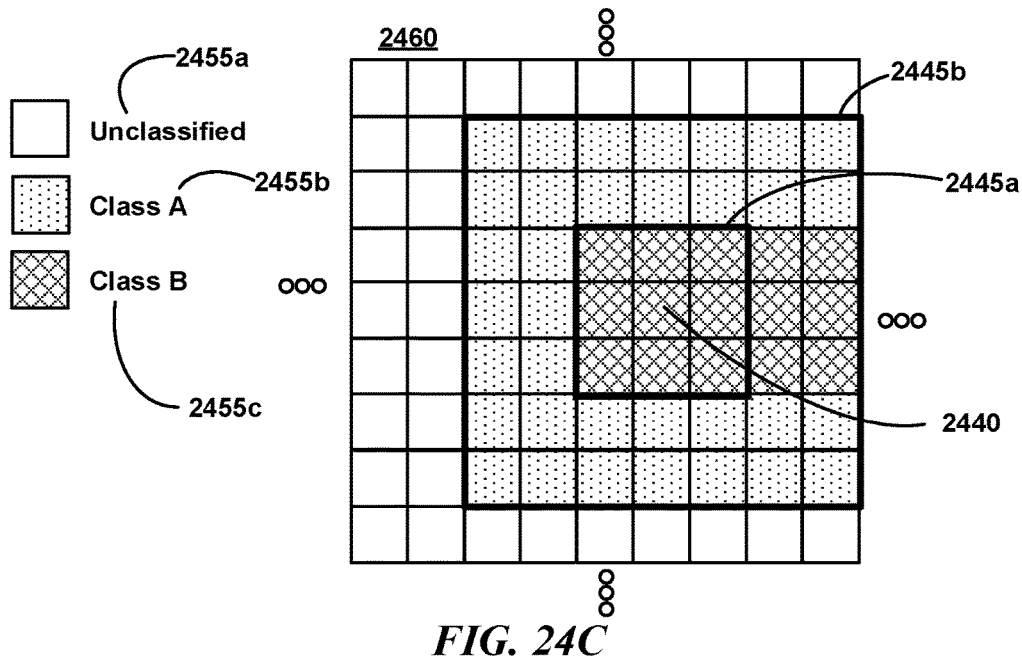
FIG. 24C is a schematic diagram of a pixel grid from an in-situ frame depicting inefficiencies of a larger template as may occur in some embodiments.

FIG. 24C is a schematic diagram of a pixel grid from an in-situ frame depicting inefficiencies of a larger template as may occur in some embodiments. This example demonstrates how larger template sizes may precipitate higher classification error rates. Particularly, consider a depth pixel frame 2460 acquired by the system during in situ classification. The frame may include pixel values that would, ideally, be unclassified 2455a (e.g., falling within no class or a "catch-all" background class), a first Class A 2455b, or a second Class B 2455c. At present, the system may be attempting to classify the pixel 2440, which, ideally, would be correctly classified as Class B 2455c.

When the template size is a 3×3 square, as indicated by template 2445a, the classifier is more likely to make the correct prediction of Class B 2455c for pixel 2440 as all the neighboring pixels fall within the second Class B 2455c. However, a larger 7×7 template size, as indicated by template 2445b, is likely to produce incorrect results because Class A 2455b pixels outnumber Class B 2455c pixels in the template. This is not necessarily the result, as some machine learning methods may still be able to distinguish the pattern as being associated with Class B 2455c. Often, however, the inclusion of too many neighbors mitigates the machine learning method's ability to distinguish fine boundaries between classes. Often, classes will demonstrate continuity with their immediate neighbors and so the inclusion of more distant pixels from the candidate pixel will reduce the immediate neighbors' influence upon the classifier. Accordingly, there is often an "optimal" template size for a given classification problem, depending, e.g., upon the classes and their relations to one another.

Figure 25:
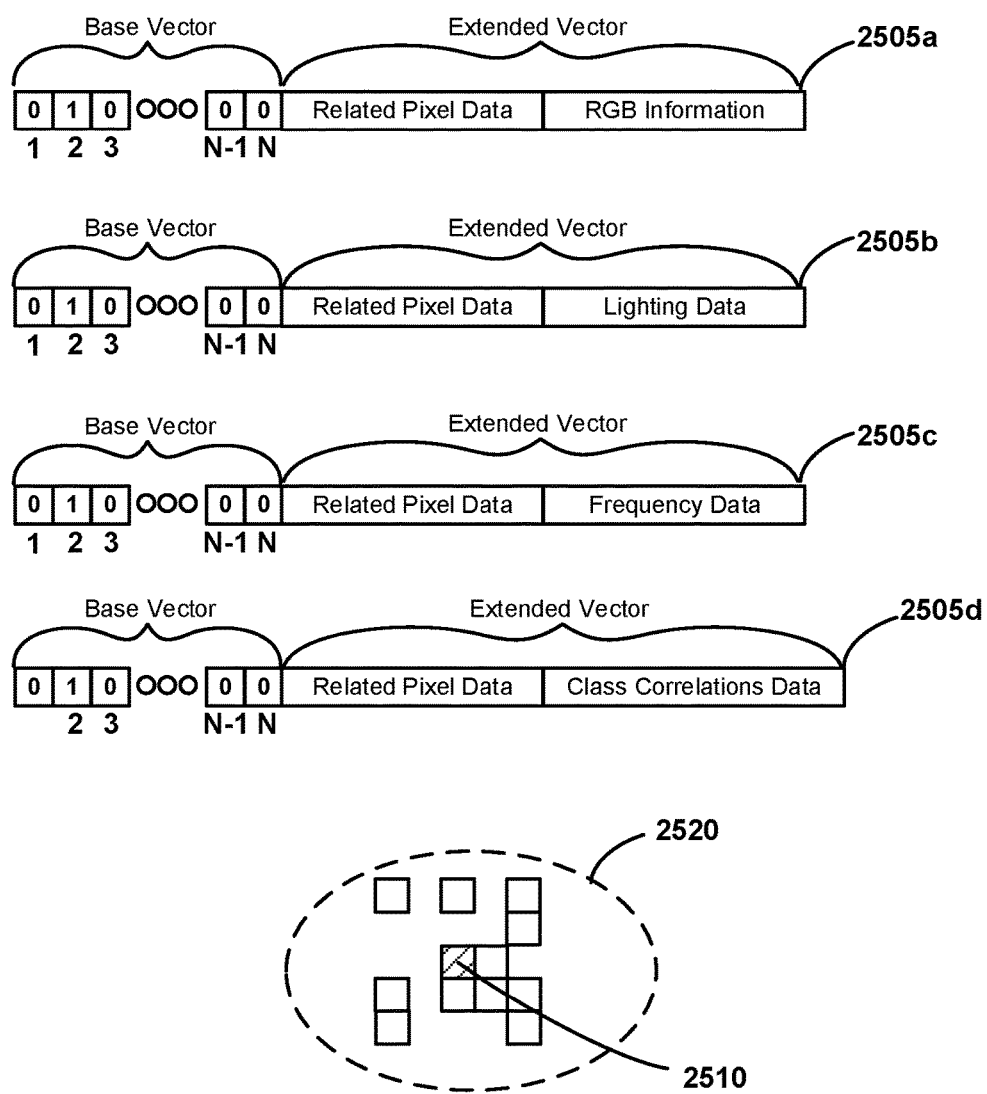
FIG. 25 is a schematic diagram illustrating extended vector variations that may be used in some embodiments, alone or in combination, with each other or other extended vectors discussed herein.

Extended Vectors for Improved Training and Classification—Extended Vector Variations FIG. 25 is a schematic diagram illustrating extended vector variations that may be used in some embodiments, alone or in combination, with each other or other extended vectors discussed herein. For example, in the combined vector 2505a, not only related pixel information, but RGB data regarding the candidate pixel and/or related pixels may be included. In the combined vector 2505b, lighting data, such as a reflectance, associated with the candidate pixel and/or related pixels may be included. Such reflectance may be especially useful where the system includes its own light source for illuminating its field of view. In the combined vector 2505c, the system may consider frequency data related to the related pixels, or the image as a whole. For example, images with more high than low frequency components may warrant a different classification strategy from images with more low than high frequency components. By appending this information about the image as whole to the end of the vector, the system may cause the classifier to more clearly recognize the different contexts. One will recognize that a similar approach may be used, e.g., for overall lighting conditions, image types, image sizes, application contexts, etc. In the combined vector 2505d, the vector includes class correlation information. For example, the vector may summarize relationships between classes or values identified in the related pixels and candidate pixel.

Additionally, as mentioned herein, one will recognize that the method for selecting related pixels may take on a variety of forms. For example, disjoint templates 2520 relative to the candidate pixel 2510 may be generated based upon past experience with the classification problem. That is, the template used may itself be the product of a machine learning process. A deep learning system may be used to identify the most effective template structures for identifying related pixels in a given problem context with a given set of classes. This template may then be used for identifying related pixels to the candidate pixels as described herein. Accordingly, the system may use different templates for different in-situ locations and situations in some embodiments.

Computer System

Figure 26:
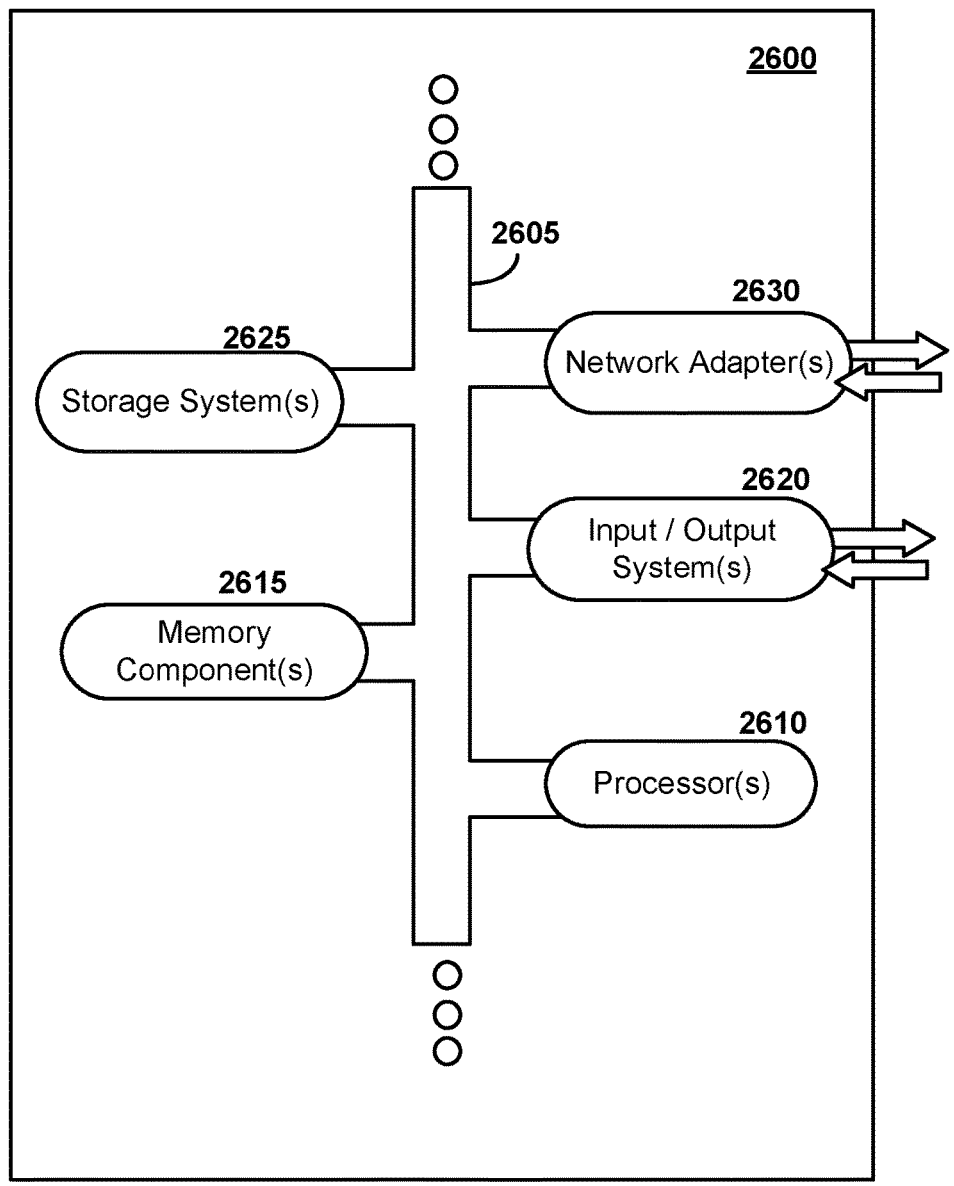
FIG. 26 is a block diagram of an example computer system as may be used in conjunction with some of the embodiments.

FIG. 26 is a block diagram of an example computer system as may be used in conjunction with some of the embodiments. The computing system 2600 may include an interconnect 2605, connecting several components, such as, e.g., one or more processors 2610, one or more memory components 2615, one or more input/output systems 2620, one or more storage systems 2625, one or more network adaptors 2630, etc. The interconnect 2605 may be, e.g., one or more bridges, traces, busses (e.g., an ISA, SCSI, PCI, I2C, Firewire bus, etc.), wires, adapters, or controllers.

The one or more processors 2610 may include, e.g., an Intel™ processor chip, a math coprocessor, a graphics processor, etc. The one or more memory components 2615 may include, e.g., a volatile memory (RAM, SRAM, DRAM, etc.), a non-volatile memory (EPROM, ROM, Flash memory, etc.), or similar devices. The one or more input/output devices 2620 may include, e.g., display devices, keyboards, pointing devices, touchscreen devices, etc. The one or more storage devices 2625 may include, e.g., cloud based storages, removable USB storage, disk drives, etc. In some systems memory components 2615 and storage devices 2625 may be the same components. Network adapters 2630 may include, e.g., wired network interfaces, wireless interfaces, Bluetooth adapters, line-of-sight interfaces, etc.

One will recognize that only some of the components, alternative components, or additional components than those depicted in FIG. 26 may be present in some embodiments. Similarly, the components may be combined or serve dual-purposes in some systems. The components may be implemented using special-purpose hardwired circuitry such as, for example, one or more ASICs, PLDs, FPGAs, etc. Thus, some embodiments may be implemented in, for example, programmable circuitry (e.g., one or more microprocessors) programmed with software and/or firmware, or entirely in special-purpose hardwired (non-programmable) circuitry, or in a combination of such forms.

In some embodiments, data structures and message structures may be stored or transmitted via a data transmission medium, e.g., a signal on a communications link, via the network adapters 2630. Transmission may occur across a variety of mediums, e.g., the Internet, a local area network, a wide area network, or a point-to-point dial-up connection, etc. Thus, "computer readable media" can include computer-readable storage media (e.g., "non-transitory" computer-readable media) and computer-readable transmission media.

The one or more memory components 2615 and one or more storage devices 2625 may be computer-readable storage media. In some embodiments, the one or more memory components 2615 or one or more storage devices 2625 may store instructions, which may perform or cause to be performed various of the operations discussed herein. In some embodiments, the instructions stored in memory 2615 can be implemented as software and/or firmware. These instructions may be used to perform operations on the one or more processors 2610 to carry out processes described herein. In some embodiments, such instructions may be provided to the one or more processors 2610 by downloading the instructions from another system, e.g., via network adapter 2630.

REMARKS

The above description and drawings are illustrative. Consequently, neither the description nor the drawings should be construed so as to limit the disclosure. For example, titles or subtitles have been provided simply for the reader's convenience and to facilitate understanding. Thus, the titles or subtitles should not be construed so as to limit the scope of the disclosure, e.g., by grouping features which were presented in a particular order or together simply to facilitate understanding. Unless otherwise defined herein, all technical and scientific terms used herein have the same meaning as commonly understood by one of ordinary skill in the art to which this disclosure pertains. In the case of conflict, this document, including any definitions provided herein, will control. A recital of one or more synonyms herein does not exclude the use of other synonyms. The use of examples anywhere in this specification including examples of any term discussed herein is illustrative only, and is not intended to further limit the scope and meaning of the disclosure or of any exemplified term.

Similarly, despite the particular presentation in the figures herein, one skilled in the art will appreciate that actual data structures used to store information may differ from what is shown. For example, the data structures may be organized in a different manner, may contain more or less information than shown, may be compressed and/or encrypted, etc. The drawings and disclosure may omit common or well-known details in order to avoid confusion. Similarly, the figures may depict a particular series of operations to facilitate understanding, which are simply exemplary of a wider class of such collection of operations. Accordingly, one will readily recognize that additional, alternative, or fewer operations may often be used to achieve the same purpose or effect depicted in some of the flow diagrams. For example, data may be encrypted, though not presented as such in the figures, items may be considered in different looping patterns ("for" loop, "while" loop, etc.), or sorted in a different manner, to achieve the same or similar effect, etc.

Reference in this specification to "one embodiment" or "an embodiment" means that a particular feature, structure, or characteristic described in connection with the embodiment is included in at least one embodiment of the disclosure. Consequently, the phrase "in one embodiment" in various places in the specification is not necessarily referring to the same embodiment in each of those various places. Separate or alternative embodiments may not be mutually exclusive of other embodiments. One will recognize that various modifications may be made without deviating from the scope of the embodiments.

We claim:

1. A computer system configured to generate a depth-value classifier comprising:
    at least one processor;
    at least one memory comprising instructions configured to cause the at least one processor to perform a method comprising:
        receiving a candidate depth pixel associated with a class;
        generating a base vector by applying the candidate depth pixel to one or more trees;
        generating an extended vector;
        providing the base vector and the extended vector to a machine learning system to generate a classifier;
        wherein generating an extended vector comprises:
            determining classification probabilities for nodes in trees of the one or more trees for a related pixel; and
            generating a vector based on the classification probabilities for the nodes, wherein the number of entries in the extended vector is less than the number of entries in the base vector.

2. The computer system of claim 1, wherein generating an extended vector comprises concatenating base vectors of one or more pixels neighboring the candidate depth pixel.

3. The computer system of claim 1, wherein generating an extended vector comprises summing base vectors of one or more pixels neighboring the candidate depth pixel.

4. The computer system of claim 3, wherein
    the machine learning system is a support vector machine, wherein
    generating an extended vector comprises performing a second pass after generating the base vector, and wherein
    providing the base vector and the extended vector comprises providing a combined vector, the combined vector comprising the extended vector appended to the base vector.

5. The computer system of claim 4, the method further comprising:
    determining that a classification with the classifier was successful;
    generating new training data in association with the successful classification; and
    generating a new classifier using the new training data.

6. The computer system of claim 1,
    wherein the machine learning system is a support vector machine and wherein the method further comprises determining that the number of entries in the extended vector will include less than the number of entries in the base vector based, at least in part, on a determination that the system is still engaged in a classification session.

7. The computer system of claim 1, wherein
    the machine learning system is a support vector machine, and wherein
    providing the base vector and the extended vector comprises providing a combined vector, the combined vector comprising the extended vector appended to the base vector.

8. A computer-implemented method comprising:
    receiving a candidate depth pixel associated with a class;
    generating a base vector by applying the candidate depth pixel to one or more trees;
    generating an extended vector;
    providing the base vector and the extended vector to a machine learning system to generate a classifier;
    wherein generating an extended vector comprises:
        determining classification probabilities for nodes in trees of the one or more trees for a related pixel; and
        generating a vector based on the classification probabilities for the nodes, wherein the number of entries in the extended vector is less than the number of entries in the base vector.

9. The computer-implemented method of claim 8, wherein generating an extended vector comprises concatenating base vectors of one or more pixels neighboring the candidate depth pixel.

10. The computer-implemented method of claim 8, wherein generating an extended vector comprises summing base vectors of one or more pixels neighboring the candidate depth pixel.

11. The computer-implemented method of claim 10, wherein
    the machine learning system is a support vector machine, wherein
    generating an extended vector comprises performing a second pass after generating the base vector, and wherein
    providing the base vector and the extended vector comprises providing a combined vector, the combined vector comprising the extended vector appended to the base vector.

12. The computer-implemented method of claim 11, the method further comprising:
    determining that a classification with the classifier was successful;
    generating new training data in association with the successful classification; and
    generating a new classifier using the new training data.

13. The computer-implemented method of claim 8, wherein the machine learning system is a support vector machine and wherein the method further comprises determining that the number of entries in the extended vector will include less than the number of entries in the base vector based, at least in part, on a determination that the system is still engaged in a classification session.

14. The computer-implemented method of claim 8, wherein the machine learning system is a support vector machine, and wherein providing the base vector and the extended vector comprises providing a combined vector, the combined vector comprising the extended vector appended to the base vector.

15. A non-transitory computer-readable medium comprising instructions configured to cause a computer system to perform a method comprising:
   receiving a candidate depth pixel associated with a class;
   generating a base vector by applying the candidate depth pixel to one or more trees;
   generating an extended vector;
   providing the base vector and the extended vector to a machine learning system to generate a classifier;
   wherein generating an extended vector comprises:
      determining classification probabilities for nodes in trees of the one or more trees for a related pixel; and
      generating a vector based on the classification probabilities for the nodes, wherein the number of entries in the extended vector is less than the number of entries in the base vector.

16. The non-transitory computer-readable medium of claim 15, wherein generating an extended vector comprises concatenating base vectors of one or more pixels neighboring the candidate depth pixel.

17. The non-transitory computer-readable medium of claim 15, wherein generating an extended vector comprises summing base vectors of one or more pixels neighboring the candidate depth pixel.

18. The non-transitory computer-readable medium of claim 17, wherein the machine learning system is a support vector machine, wherein generating an extended vector comprises performing a second pass after generating the base vector, and wherein providing the base vector and the extended vector comprises providing a combined vector, the combined vector comprising the extended vector appended to the base vector.

19. The non-transitory computer-readable medium of claim 18, the method further comprising:
   determining that a classification with the classifier was successful;
   generating new training data in association with the successful classification; and
   generating a new classifier using the new training data.

20. The non-transitory computer-readable medium of claim 15, wherein the machine learning system is a support vector machine and wherein the method further comprises determining that the number of entries in the extended vector will include less than the number of entries in the base vector based, at least in part, on a determination that the system is still engaged in a classification session.

21. The non-transitory computer-readable medium of claim 15, wherein
   the machine learning system is a support vector machine, and wherein
   providing the base vector and the extended vector comprises providing a combined vector, the combined vector comprising the extended vector appended to the base vector.

* * * * *